United States Patent
Adachi et al.

(10) Patent No.: US 7,756,162 B2
(45) Date of Patent: Jul. 13, 2010

(54) WIRELESS COMMUNICATION APPARATUS AND WIRELESS COMMUNICATION METHOD

(75) Inventors: Tomoko Adachi, Urayasu (JP); Masahiro Takagi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 232 days.

(21) Appl. No.: 12/164,483

(22) Filed: Jun. 30, 2008

(65) Prior Publication Data

US 2009/0010199 A1 Jan. 8, 2009

(30) Foreign Application Priority Data

Jul. 3, 2007 (JP) .............................. 2007-175568

(51) Int. Cl.
*H04J 3/08* (2006.01)
*H04W 4/00* (2009.01)

(52) U.S. Cl. ...................... 370/501; 370/338; 370/913

(58) Field of Classification Search ................. 370/501, 370/471, 464, 338, 913
See application file for complete search history.

(56) References Cited

U.S. PATENT DOCUMENTS

| | | | |
|---|---|---|---|
| 6,046,978 A | 4/2000 | Melnik | |
| 6,138,165 A * | 10/2000 | Nakatsugawa | 709/245 |
| 6,947,768 B2 | 9/2005 | Adachi et al. | |
| 7,111,119 B2 * | 9/2006 | Minowa | 711/114 |
| 7,577,124 B2 * | 8/2009 | Yomo et al. | 370/338 |
| 2003/0016650 A1 | 1/2003 | Missel | |
| 2003/0063607 A1 * | 4/2003 | Adachi et al. | 370/389 |
| 2005/0243787 A1 * | 11/2005 | Hong et al. | 370/338 |
| 2008/0107033 A1 * | 5/2008 | Zhang et al. | 370/238 |
| 2010/0020738 A1 * | 1/2010 | Inouchi et al. | 370/315 |

FOREIGN PATENT DOCUMENTS

| | | |
|---|---|---|
| JP | 3774426 | 2/2006 |
| JP | 3774469 | 2/2006 |
| JP | 2006-140943 | 6/2006 |
| JP | 2006-279168 | 10/2006 |
| WO | WO 02/076028 A1 | 9/2002 |
| WO | WO 2005/079025 A1 | 8/2005 |

OTHER PUBLICATIONS

W. Steven Conner, et al., "IEEE 802.11s Tutorial, Overview of the Amendment for Wireless Local Area Mesh Networking": [Online, tutorial document at the IEEE802 November Plenary Meeting], Nov. 13, 2006, pp. 1-94. <URL:http://www.ieee802.org/802_tutorials/index.htm"Tutorial#1(6:30pm):802.11s:WLANMeshNetworking">.

* cited by examiner

Primary Examiner—Chi H Pham
Assistant Examiner—Robert Lopata
(74) Attorney, Agent, or Firm—Oblon, Spivak, McClelland, Maier & Neustadt, L.L.P.

(57) ABSTRACT

A wireless communication apparatus having a relay function comprises a memory to store an address of a first wireless communication apparatus connected to the wireless communication apparatus and having a relay function, and a transmitting unit configured to transmit a first relay frame addressed to the first wireless communication apparatus, the first relay frame including a first address field prepared for a final destination address, an address of a second communication apparatus not connected to the wireless communication apparatus being set in the first address field, and a second address field prepared for an address of a third wireless communication apparatus connecting the second communication apparatus and having a relay function, one of an address except for the address of the third wireless communication apparatus and a specific value being set in the second address field.

20 Claims, 18 Drawing Sheets

| BSSID | Connected terminal |
|---|---|
| R201 | 101 |
|  | 102 |
|  | R202 |

| BSSID | Connected terminal |
|---|---|
| R203 | 103 |
|  | R202 |
|  | R204 |

| BSSID | Connected terminal |
|---|---|
| R204 | 301 |
|  | R203 |

| BSSID | Connected terminal |
|---|---|
| R202 | R201 |
|  | R203 |
| R201 | 101 |
|  | 102 |
|  | R202 |
| R203 | 103 |
|  | R202 |
|  | R204 |

|     | To DS | From DS | AE | Address 1 | Address 2 | Address 3 | Address 4 | Address 5 | Address 6 |
| --- | --- | --- | --- | --- | --- | --- | --- | --- | --- |
| (a) | 0 | 0 | 0 | RA | TA | BSSID | N/A | N/P | N/P |
| (b) | 0 | 1 | 0 | RA | TA | SA | N/A | N/P | N/P |
| (c) | 1 | 0 | 0 | RA | TA | DA | N/A | N/P | N/P |
| (d) | 1 | 1 | 0 | RA | TA | DA | SA | N/P | N/P |
| (e) | 1 | 1 | 1 | RA | TA | Relay DA | Relay SA | DA | SA |

FIG. 7

| | To DS | From DS | AE | Address 1 (RA) | Address 2 (TA) | Address 3 (Relay DA/SA) | Address 4 (Relay SA) | Address 5 (DA) | Address 6 (SA) |
|---|---|---|---|---|---|---|---|---|---|
| (a) | 1 | 1 | 1 | "202" | "201" | "203" | "201" | "103" | "101" |
| (b) | 1 | 1 | 1 | "203" | "202" | "203" | "201" | "103" | "101" |
| (c) | 0 | 1 | 0 | "103" | "203" | "101" | N/A | N/P | N/P |

F I G. 10

| | To DS | From DS | AE | Address 1 (RA) | Address 2 (TA) | Address 3 (Relay DA/SA) | Address 4 (Relay SA) | Address 5 (DA) | Address 6 (SA) |
|---|---|---|---|---|---|---|---|---|---|
| (a) | 1 | 1 | 1 | "202" | "201" | "202" | "201" | "103" | "101" |
| (b) | 1 | 1 | 1 | "203" | "202" | "203" | "201" | "103" | "101" |
| (c) | 0 | 1 | 0 | "103" | "203" | "101" | N/A | N/P | N/P |

FIG. 11

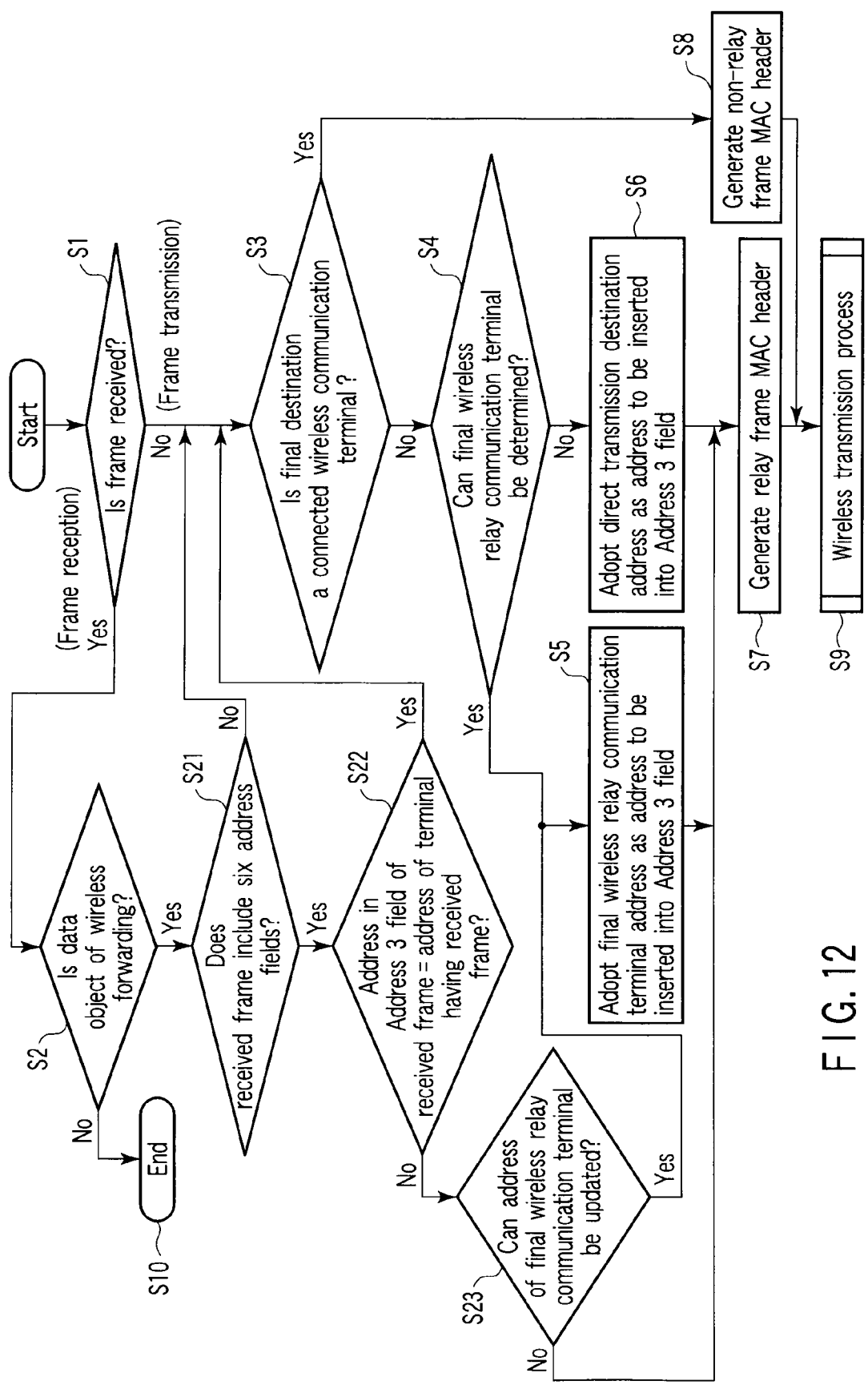
F I G. 12

| To DS | From DS | AE | Address 1 (RA) | Address 2 (TA) | Address 3 (Relay DA) | Address 4 (Relay SA) | Address 5 (DA) | Address 6 (SA) |
|---|---|---|---|---|---|---|---|---|
| 1 | 1 | 1 | "203" | "202" | "205" | "201" | "103" | "101" |
| 1 | 1 | 1 | "205" | "202" | "205" | "201" | "103" | "101" |

(a)

(b)

WIRELESS COMMUNICATION APPARATUS AND WIRELESS COMMUNICATION METHOD

CROSS-REFERENCE TO RELATED APPLICATIONS

This application is based upon and claims the benefit of priority from prior Japanese Patent Application No. 2007-175568, filed Jul. 3, 2007, the entire contents of which are incorporated herein by reference.

BACKGROUND OF THE INVENTION

1. Field of the Invention

The present invention relates to multi-hop communication that forwards data to a wireless communication apparatus via wireless relay communication apparatuses.

2. Description of the Related Art

When a wireless communication terminal for performing conventional relay (to be referred to as a wireless relay communication terminal hereinafter) relays data, the address of a final wireless relay communication terminal in a relay system is described in an address field of a frame to be transmitted, in addition to the address of a wireless relay communication terminal as the direct transmission destination of the frame (e.g., Japanese Patent Nos. 3774426 and 3774469, and W. Steven Conner et al., "IEEE802.11s Tutorial, Overview of the Amendment for Wireless Local Area Mesh Networking," [online, IEEE802 Meeting Tutorial Reference], Nov. 13, 2006, IEEE802, Internet <URL: http://www.ieee802.org/802_tutorials/index.htm "Tutorial #1 (6:30 pm):802.11s: WLAN Mesh Networking">). A method is described by which if no routing information has been established when transmitting the frame to the final wireless relay communication terminal, a broadcast address is set in the field for the address of the wireless relay communication terminal as the direct transmission destination, thereby delivering the frame to the final wireless relay communication terminal (e.g., Japanese Patent No. 3774426 or 3774469).

There is also a method of relaying forwarding data by encapsulating such data (e.g., JP-A. 2006-279168 (KOKAI)), and a method of adding an address on a relay route to a frame header (e.g., JP-A. No. 2006-140943 (KOKAI)).

Unfortunately, the above-mentioned conventional techniques are based on the assumption that the final wireless relay terminal is determined, and hence cannot relay data if the terminal is undetermined. Also, none of the conventional techniques describe a method of controlling data relay in a situation in which a communication terminal connecting to the final wireless relay communication terminal is the final destination terminal of data, and the final wireless relay communication terminal is changed because, e.g., the destination address terminal also connects to another wireless relay communication terminal. If a wireless relay communication terminal that is in power save mode exists, it is difficult to expect that routing information will be properly updated in the wireless relay system. Accordingly, the wireless relay will not function in the real system.

BRIEF SUMMARY OF THE INVENTION

According to embodiments of the present invention, a wireless communication apparatus having a relay function stores, in a memory, addresses of a plurality of other wireless communication apparatuses including a first wireless communication apparatus connected to the wireless communication apparatus and having a relay function;

transmits a first relay frame addressed to the first wireless communication apparatus, the first relay frame including (a) a first address field prepared for describing a final destination address, an address of a second communication apparatus not connected to the wireless communication apparatus being described in the first address field, and (b) a second address field prepared for describing an address of a third wireless communication apparatus connecting the second communication apparatus and having a relay function, one of an address except for the address of the third wireless communication apparatus and a specific value being described in the second address field, when the address of the third wireless communication apparatus is not stored in the memory; and transmits, when the address of the third wireless communication apparatus is stored in the memory, a second relay frame including (a) the first address field in which the address of the second communication apparatus is described, and (b) the second address field in which the address of the third wireless communication apparatus is described.

BRIEF DESCRIPTION OF THE SEVERAL VIEWS OF THE DRAWING

FIG. 7 is a view showing a method of using address fields;

FIG. 10 is a view showing an example of the use of the address fields when a final wireless relay communication terminal is determined;

FIG. 11 is a view showing an example of the use of the address fields when a final wireless relay communication terminal is undetermined;

FIG. 12 is a flowchart for explaining the operation of a wireless relay communication terminal according to the third embodiment;

DETAILED DESCRIPTION OF THE INVENTION

Figure 1:
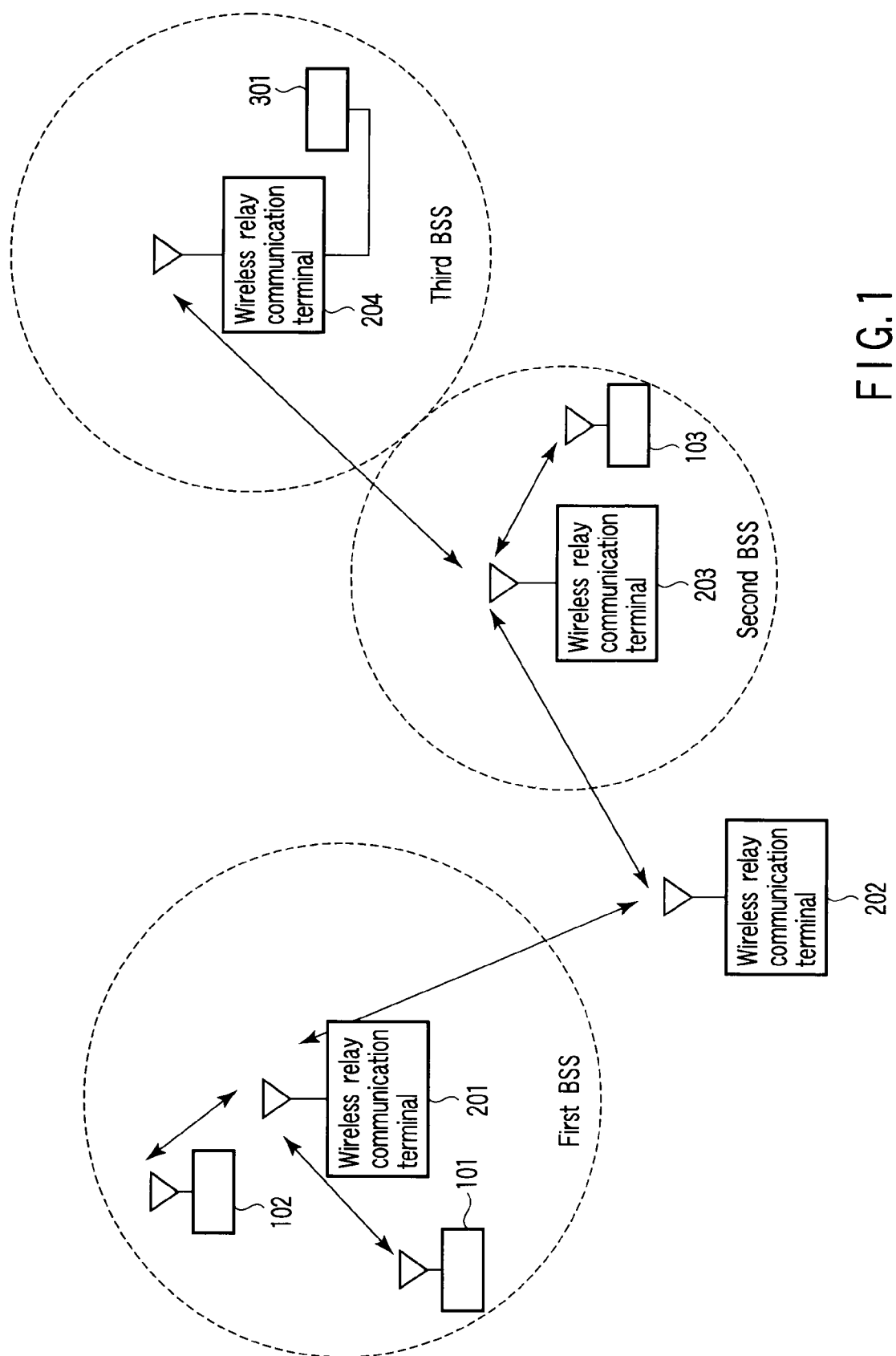
FIG. 1 is a view showing an example of the configuration of a wireless communication system according to embodiments of the present invention when relaying data between wireless communication terminals.

In the system shown in FIG. 1, wireless communication terminals 201, 202, 203, and 204 having a wireless relay function (wireless relay communication terminals) are connected. The wireless relay communication terminal may also connect to a plurality of wireless relay communication terminals or to a plurality of wireless communication terminals or wired communication terminals having no wireless relay function. Referring to FIG. 1, the wireless relay communication terminal 201 is connected to wireless communication terminals 101 and 102 having no wireless relay function, and the wireless relay communication terminal 203 is connected to a wireless communication terminal 103 having no wireless relay function. The wireless relay communication terminal 202 is not connected to any wireless communication terminal having no wireless relay function, and the wireless relay communication terminal 204 is connected to a communication terminal 301 through wire (wired communication terminal).

A wireless relay communication terminal and wireless communication terminals connecting to the wireless relay communication terminal and having no wireless relay function correspond to the infrastructure BSS (Basic Service Set) configured by units called a wireless base station and wireless communication terminals in the IEEE802.11 wireless LAN system. Any wireless relay communication terminal may and may not connect to a wireless communication terminal having no wireless relay function, and need not connect to any communication terminal through wire. A wireless communication terminal connecting to a wireless relay communication terminal and having no wireless communication function need not only perform wireless communication with the wireless relay communication terminal, but may also perform wireless communication with a wireless communication terminal connecting to the wireless relay communication terminal and having no wireless relay function.

A communication form that performs wireless data relay is called wireless relay communication or multi-hop communication, and a system consisting of such kind of wireless communication is called a wireless relay system or multi-hop communication system. Data is converted into a frame corresponding to the wireless communication method, and transmitted to another wireless communication terminal connected by wireless communication. An example of the data is data forwarded from the Logical Link Control (LLC) layer as the upper layer of the MAC (Media Access Control) layer in the IEEE802.11 wireless LAN system, and inserted as a payload or Frame Body field into the frame.

For example, when transmitting data from the wireless communication terminal 101 to the communication terminal 301 in FIG. 1, the wireless communication terminal 101 converts the data into a frame and transmits the frame to the wireless relay communication terminal 201. The wireless relay communication terminal 201 converts the received frame into a frame addressed to the wireless relay communication terminal 202, and transmits the frame. The wireless relay communication terminal 202 converts the received frame into a frame addressed to the wireless relay communication terminal 203, and transmits the frame. The wireless relay communication terminal 203 converts the received frame into a frame addressed to the wireless relay communication terminal 204, and transmits the frame. In this case, the wireless communication terminal 101 is the generation source of the frame, and the communication terminal 301 is the final destination terminal of the frame. Also, the wireless relay communication terminal 204 is the final relay wireless communication terminal. The function of the wireless relay communication terminal which converts a received frame into a frame directed to the next communication terminal and transmits the frame is called a relay function or forwarding function.

Although the case where the wireless communication terminal 101 transmits data to the communication terminal 301 has been explained above, the wireless relay communication terminal 204, for example, may also be the final destination terminal of the frame. In this case, the final wireless relay communication terminal and the final destination terminal are the same. Likewise, the wireless communication terminal 103, for example, may also be the final destination (wireless) terminal of the frame, in which case the wireless relay communication terminal 203 is the final wireless relay communication terminal.

Figures 2, 3A, 3B, 3C, 3D:
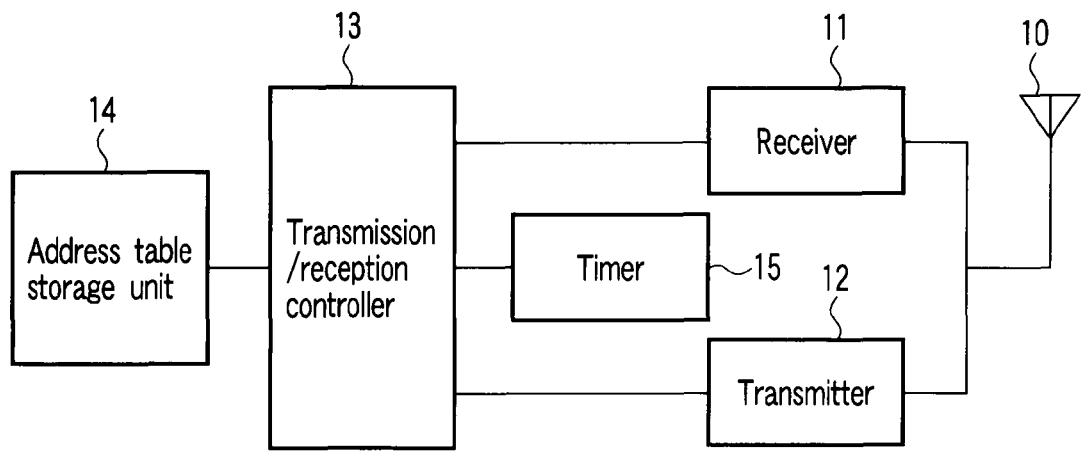
FIG. 2 is a view showing an example of the arrangement of a wireless communication terminal having a wireless relay function (i.e. wireless relay communication terminal)
FIGS. 3A to 3D are views showing practical examples of an address table.

FIG. 2 shows an example of the arrangement of the main parts of the wireless relay communication terminal. Referring to FIG. 2, the wireless relay communication terminal includes an antenna 10, a receiver 11, a transmitter 12, a transmission/reception controller 13, an address table storage unit 14, and a timer 15. Note that when the wireless relay communication terminal has a function of connecting to the communication terminal 301 through wire like the wireless relay communication terminal 204 shown in FIG. 1, the wireless relay communication terminal further includes a wired communication functional unit connected to the transmission/reception controller 13.

The receiver 11 performs, e.g., frequency conversion, conversion from an analog signal to a digital signal, and demodulation on a signal received by the antenna 10, and outputs the signal to the transmission/reception controller 13. The transmitter 12 performs, e.g., modulation, conversion from a digital signal to an analog signal, and frequency conversion on an input signal from the transmission/reception controller 13, and transmits the signal from the antenna 10.

The transmission/reception controller 13 incorporates a memory for providing a work area, frame buffer, and the like, and conforms to, e.g., the IEEE802.11 wireless LAN (including wireless LANs corresponding to a series of amended/extended standards of IEEE802.11 such as 802.11a, 802.11b, 802.11e, 802.11g, 802.11h, 802.11i, and 802.11j) system. The transmission/reception controller 13 performs an operation defined for the MAC layer and an operation defined for the PHY (physical) layer.

As the defined MAC layer operation, the transmission/reception controller 13 performs, e.g., MAC header processing, access control in frame transmission, received frame processing including response frame transmission, and management related to the settings between wireless communication terminals. The transmission/reception controller 13 also performs a process of receiving data to be transmitted from the upper layer of the MAC layer, and forwarding received data to the upper layer of the MAC layer if the final destination of the data is its own terminal.

As the defined PHY layer operation, the transmission/reception controller 13 performs, e.g., PLCP (Physical Layer Convergence Protocol) header processing.

The address table storage unit 14 stores an address table registering routing information. A wireless relay communication terminal uses the routing information in a relay process for forwarding data to another wireless communication terminal. Note that this address table need not store routing information for relaying data to all communication terminals. Note also that the transmission/reception controller 13 may include the address table storage unit 14.

As shown in FIGS. 3A to 3D, the address table registers, for the address (e.g., the MAC address) of each wireless relay communication terminal, the address (e.g., the MAC address) of a terminal connected to the wireless relay communication terminal. For example, FIG. 3A shows an address table corresponding to the first BSS that the wireless relay communication terminal 201 belongs to, FIG. 3B shows an address table corresponding to the second BSS that the wireless relay communication terminal 203 belongs to, and FIG. 3C shows an address table corresponding to the third BSS that the wireless relay communication terminal 204 belongs to.

Note that in the following explanation, the addresses (MAC addresses) of the wireless relay communication terminals 201 to 204 will be denoted by "201" to "204" by directly using their reference numerals, and the addresses (MAC addresses) of the terminals 101 to 103 and 301 will be denoted by "101" to "103" and "301" by directly using their reference numerals. Note also that the addresses (MAC addresses) of the wireless relay communication terminals 201 to 204 will be used as the identifiers (BSSIDs) of the BSSs to which these wireless relay communication terminals belong.

The address table storage unit 14 of each wireless relay communication terminal stores an address table registering the MAC addresses of wireless communication terminals (including wireless relay communication terminals) connected to the wireless relay communication terminal. For example, as shown in FIG. 3A, the address table storage unit 14 of the wireless relay communication terminal 201 stores an address table registering the MAC addresses of the wireless communication terminals 101 and 102 and the wireless relay communication terminal 202 connected to the wireless relay communication terminal 201. Likewise, as shown in FIG. 3B, the address table storage unit 14 of the wireless relay communication terminal 203 stores an address table registering the MAC addresses of the wireless communication terminal 103 and the wireless relay communication terminals 202 and 204 connected to the wireless relay communication terminal 203. Also, as shown in FIG. 3C, the address table storage unit 14 of the wireless relay communication terminal 204 stores an address table registering the MAC addresses of the communication terminal 301 and the wireless relay communication terminal 203 connected to the wireless relay communication terminal 204.

Furthermore, as shown in FIG. 3D, the address table storage unit 14 of the wireless relay communication terminal 202 stores an address table registering the MAC addresses of the wireless relay communication terminals 201 and 203 connected to the wireless relay communication terminal 202, the address table as shown in FIG. 3A received from the wireless relay communication terminal 201 when the wireless relay communication terminal 202 is connected to the wireless relay communication terminal 201, and the address table as shown in FIG. 3B received from the wireless relay communication terminal 203 when the wireless relay communication terminal 202 is connected to the wireless relay communication terminal 203. That is, the MAC addresses of the wireless relay communication terminals 201 and 203 connected to the wireless relay communication terminal 202 are also registered in the "BSSID" field of the address table shown in FIG. 3D, and the MAC addresses of the wireless communication terminals 101 and 102 and the wireless relay communication terminal 202 connected to the wireless relay communication terminal 201 and the MAC addresses of the wireless communication terminal 103 and the wireless relay communication terminals 202 and 204 connected to the wireless relay communication terminal 203 are registered in the "connected terminal" field of the address table shown in FIG. 3D. This address table may also include information indicating which communication terminal has a relay function (which communication terminal is a wireless relay communication terminal), in addition to the address of the terminal. Note that in FIGS. 3A to 3D, "R" is prefixed to the address of each wireless relay communication terminal to indicate that the address represents a wireless relay communication terminal.

As described above, each wireless relay communication terminal can also exchange address tables with another wireless relay communication terminal when connected to it.

Note that the address tables as shown in FIGS. 3A to 3D show wireless communication terminals (including wireless relay communication terminals) connected to each relay communication apparatus, and a route to a target wireless communication terminal (including a wireless relay communication terminal) can be found by tracing this connection relationship. Therefore, the information registered in the address table is also called routing information.

All the wireless relay communication terminals 201 to 204 shown in FIG. 1 can find out wireless communication terminals (including wireless relay communication terminals) connected to each wireless relay communication terminal by exchanging the address tables with each other. In this case, the wireless relay communication terminal 201 can find out that the wireless relay communication terminal 204 is connected to the wireless relay communication terminal 203, and the communication terminal 301 is connected to the wireless relay communication terminal 204. However, it is sometimes impossible to obtain the address tables of some wireless relay communication terminals for some reason. For example, if only the information as shown in FIG. 3A is stored in the address table storage unit 14 of the wireless relay communication terminal 201, the wireless relay communication terminal 201 cannot find out that the wireless relay communication terminal 204 and the wireless communication terminal 103 are connected to the wireless relay communication terminal 203, and that the communication terminal 301 is connected to the wireless relay communication terminal 204.

Multi-hop communication methods for a case like this will be explained in the following embodiments.

First Embodiment

Figure 4:
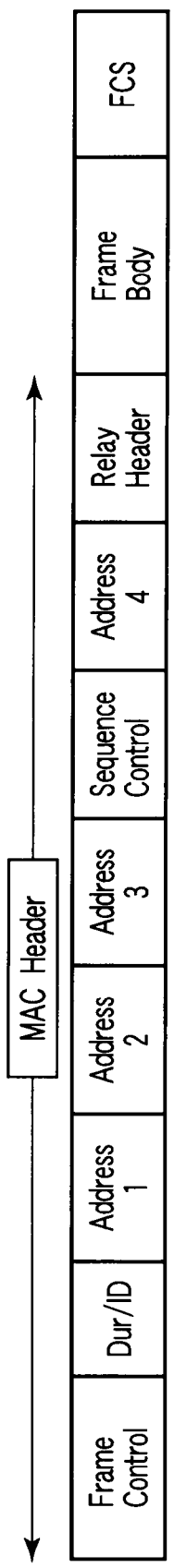
FIG. 4 is a view showing an example of the arrangement of a MAC data frame.

FIG. 4 is a view showing an example of the arrangement of a MAC data frame according to the first embodiment. A portion from a Frame Control field to a Relay Header field before a Frame Body field in FIG. 4 is a MAC header portion. Data generated in the LLC layer as the upper layer of the MAC layer is inserted into the Frame Body field in, e.g., the IEEE802.11 wireless LAN system. Fields such as a QoS Control field to be used when performing QoS control may also be added to the MAC header portion in addition to the fields shown in FIG. 4.

Figure 5:
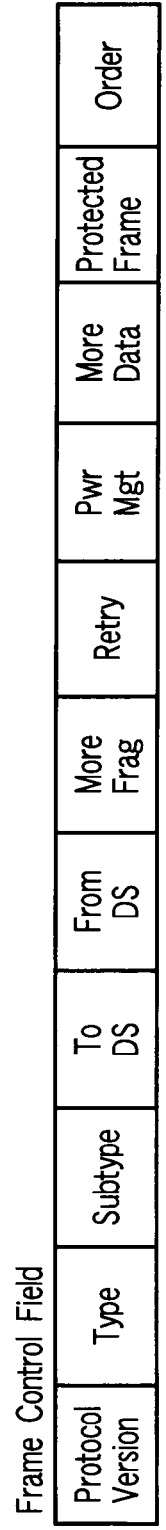
FIG. 5 is a view showing an example of the arrangement of a Frame Control field in a MAC header.
Figure 6:
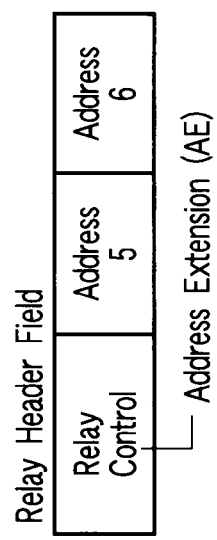
FIG. 6 is a view showing an example of the arrangement of a Relay Header field in the MAC header.

FIG. 5 illustrates the format of the Frame Control field shown in FIG. 4. FIG. 6 illustrates the format of the Relay Header field shown in FIG. 4.

The types of MAC frames to be transmitted in the IEEE802.11 wireless LAN system are a data frame for transmitting data generated in the upper layer of the MAC layer, a management frame for transmitting MAC layer level management information, and a control frame related to MAC layer access control.

The structure of the data frame is a versatile one including the structures of the management frame and the control frame. The management frame and the control frame use part of the fields shown in FIG. 4.

In the data frame, the fields in the MAC header portion are selectively used in accordance with the status of transmission as shown in FIG. 7. A ToDS field and a FromDS field exist in the Frame Control field shown in FIG. 5. The ToDS field is set to "1" when the direct transmission destination of a transmission frame is a wireless base station or a wireless relay communication terminal, and set to "0" in other cases. The FromDS field is set to "1" when the direct transmission source of a transmission frame is a wireless base station or wireless relay communication terminal, and set to "0" in other cases.

An AE (Address Extension) field exists in the Relay Header field shown in FIG. 6. The AE field is set to "1" when an Address 5 field and an Address 6 field in the Relay Header field are added, and set to "0" in other cases. The Relay Header field itself is a field added when performing wireless relay communication. The AE field can be set to "1" only when ToDS=1 and FromDS=1. Note that it is not always necessary to have this format with the AE field in the Relay Header, and it is sufficient if the addition of the Address 5 field and the Address 6 field to the MAC header portion can be indicated. For example, the addition of the Address 5 field and the Address 6 field can be indicated by a transmission frame type indicated by a Type or Subtype field in the Frame Control field or a specific value in another field (or by a combination of fields), or by detecting the capability of a terminal having transmitted the frame. For example, the existence of the Relay Header field is detected when a terminal receiving a frame is a wireless relay communication terminal and the transmission source terminal of the frame is a wireless relay communication terminal.

A row e in FIG. 7 shows an example in which when ToDS=1, FromDS=1, and AE=1, i.e., the Address 5 field and the Address 6 field are added, a Relay DA, a Relay SA, a DA, and an SA are respectively inserted into Address 3, Address 4, Address 5, and Address 6 fields. However, it is also possible to respectively insert the DA and the SA in Address 3 and Address 4 fields, in the same manner as when TODS=1, FromDS=1, and AE=0, i.e., the Address 5 field and the Address 6 field are not added, and respectively insert the Relay DA and the Relay SA necessary for wireless relay communication in Address 5 and Address 6 fields which are added. Values to be inserted into the individual address fields shown here, i.e., the DA, the SA, the Relay DA, and the Relay SA, and an RA and a TA will be described later.

Data frames related to a wireless relay communication terminal on a wireless relay communication system are the cases where ToDS=0 and FromDS=1, ToDS=1 and FromDS=0, and ToDS=1 and FromDS=1 (AE=0 or 1).

For example, the existence of the Relay Header field is indicated by the type of transmission frame indicated by the Type or Subtype field in the Frame Control field or by a specific value in another field (or by a combination of fields). Alternatively, the existence of the Relay Header field is found by detecting the capability of a terminal that transmitted the frame.

A data frame in which TODS=0 and FromDS=0 shown in a row a in FIG. 7 is exchanged between wireless communication terminals that are not base stations nor wireless rely communication terminals, i.e., wireless communication terminals that have no rely function. This data frame is used when the wireless communication terminals 101 and 102 shown in FIG. 1 perform wireless communication, or when wireless communication is performed in a wireless communication form in which no wireless base station exists (Independent Basic Service Set (IBSS) of IEEE802.11). An Address 1 field contains the direct transmission destination address (Receiver Address: RA) of a frame. Since no relay communication is performed in this case, the RA is equivalent to the final destination address (Destination Address: DA) of the frame. An Address 2 field contains the direct transmission source address (Transmitter Address: TA) of the frame. Since no relay communication is performed, the TA is equivalent to the generation source address (Source Address: SA) of the frame. A BSS identifier (BSS Identification: BSSID) is inserted into an Address 3 field. The BSSID is the MAC address of a wireless base station in the infrastructure BSS described previously. For example, in the BSS comprising the wireless relay communication terminal 201 and the wireless communication terminals 101 and 102, BSSID of the BSS is the MAC address of the wireless relay communication terminal 201. In this case, an Address 4 field is not used (Not Available: N/A). Since no Relay Header field exists, the Address 5 field and the Address 6 field do not exist either (Not Present: N/P). It is not particularly necessary to distinguish between N/A and N/P because there is no field.

A data frame in which ToDS=0 and FromDS=1 shown in a row b in FIG. 7 is transmitted from a wireless base station/wireless relay communication terminal to a wireless communication terminal that is not base station nor wireless rely communication terminal, i.e., wireless communication terminal that has no rely function. For example, this data frame is used when the wireless relay communication terminal 201 transmits a data frame to the wireless communication terminal 101 or 102, or when the wireless relay communication terminal 203 transmits a data frame to the wireless communication terminal 103. The Address 1 field contains the RA. As in the case where ToDS=0 and FromDS=0 described above, the RA is equivalent to the DA because the frame is transmitted to a wireless communication terminal (having no relay function) of a non-base station/non-wireless relay communication terminal. The Address 2 field contains the TA. Since the data frame is transmitted from a wireless base station/wireless relay communication terminal, the TA is equivalent to the MAC address of the wireless base station/wireless relay communication terminal, i.e., the BSSID. The Address 3 field contains the SA. The SA is not necessarily the same as the BSSID because there is also a case when the wireless base station/wireless relay communication terminal transmits a data frame received from another wireless communication terminal. For example, when the wireless communication terminal 101 shown in FIG. 1 is the transmission source of data and transmits the data to the wireless communication terminal 103 connecting to the wireless relay communication terminal 203, the data frame is transmitted from the wireless relay communication terminal 203 to the wireless communication terminal 103 via the wireless relay communication terminals 201 and 202. In the transmission from the wireless relay communication terminal 203 to the wireless communication terminal 103, a data frame in which TODS=0 and FromDS=1 is used, and the SA is the MAC address of the wireless communication terminal 101. The Address 4 field is not used (Not Available: N/A). Since no Relay Header field exists, the Address 5 field and the Address 6 field do not exist either (Not Present: N/P).

A data frame in which ToDS=1 and FromDS=0 shown in a row c in FIG. 7 is transmitted from a wireless communication terminal that is not base station nor wireless rely communication terminal, i.e., wireless communication terminal that has no rely function to a wireless base station/wireless relay communication terminal. This data frame is used when the wireless communication terminal 101 or 102 transmits a data frame to the wireless relay communication terminal 201 or the wireless communication terminal 103 transmits a data frame to the wireless relay communication terminal 203 in FIG. 1. The Address 1 field contains the RA. Since the data frame is transmitted to a wireless base station/wireless relay communication terminal in this case, the RA is equivalent to the MAC address of the wireless base station/wireless relay communication terminal, i.e., the BSSID. The Address 2 field contains the TA. The TA is equivalent to the SA because the data frame is transmitted from a wireless communication terminal of a non-base station/non-wireless relay communication terminal. The Address 3 field contains the DA. The DA may be different from the BSSID because the data frame may be further transmitted to another wireless base station/wireless relay communication terminal. This data frame is used as a data frame which, for example, the wireless communication terminal 101 shown in FIG. 1 transmits to the wireless relay communication terminal 201 when the data to the wireless communication terminal 103 is generated at the wireless communication terminal 101. In this case, the DA is the MAC address of the wireless communication terminal 103. The Address 4 field is not used (Not Available: N/A) in this case as well. Since no Relay Header field exists, the Address 5 field and the Address 6 field do not exist either (Not Present: N/P).

A data frame in which TODS=1 and FromDS=1 shown in a row d in FIG. 7 is transmitted from a wireless base station/wireless relay communication terminal to a wireless base station/wireless relay communication terminal. If no Relay Header field exists or the AE field in the Relay Header field is "0", the Address 1 field, the Address 2 field, the Address 3 field, and the Address 4 field respectively contain the RA, the TA, the DA, and the SA. This form is used when wireless relay can be executed by the same wireless system. When a wireless communication terminal 104 connecting to the wireless relay communication terminal 202 and having no relay function is added to FIG. 1 and the wireless communication terminal 101 generates data and transmits it to the wireless communication terminal 104, the wireless relay communication terminal 201 transmits the data frame shown in the row d in FIG. 7 to the wireless relay communication terminal 202. In this case, the RA is the MAC address of the wireless relay communication terminal 202, the TA is the MAC address of the wireless relay communication terminal 201, the DA is the MAC address of the wireless communication terminal 104, and the SA is the MAC address of the wireless communication terminal 101. If the Relay Header exists and the AE field in the Relay Header is "1", the Address 1 field and the Address 2 field similarly respectively contain the RA and the TA. However, the Address 3 field contains the address (Relay DA) of a final wireless relay communication terminal in the wireless relay system, and the Address 4 field contains the address (Relay SA) of a wireless relay communication terminal as the forwarding starting point (generation source) of a relay frame in the wireless relay system. The added Address 5 and Address 6 fields respectively contain the DA and the SA. This data frame is used when transmitting data to a final destination terminal not configured by the same wireless system.

When transmitting data generated by the wireless communication terminal 101 to the communication terminal 301 in FIG. 1, for example, the RA, the TA, the Relay SA, and the SA in a data frame which the wireless relay communication terminal 201 transmits to the wireless relay communication terminal 202 are respectively the MAC addresses of the wireless relay communication terminal 202, the wireless relay communication terminal 201, the wireless relay communication terminal 201, and the wireless communication terminal 101. The Relay DA is the MAC address of the wireless relay communication terminal 204, and the DA is the MAC address of the communication terminal 301. Also, in a data frame which the wireless relay communication terminal 202 transmits to the wireless relay communication terminal 203, the RA is the MAC address of the wireless relay communication terminal 203, the TA is the MAC address of the wireless relay communication terminal 202, and the Relay DA, the Relay SA, the DA, and the SA respectively remain the same as the MAC addresses of the wireless relay communication terminal 204, the wireless relay communication terminal 201, the communication terminal 301, and the wireless communication terminal 101. In a data frame which the wireless relay communication terminal 203 transmits to the wireless relay communication terminal 204, the RA is the MAC address of the wireless relay communication terminal 204, the TA is the MAC address of the wireless relay communication terminal 203, and the Relay DA, the Relay SA, the DA, and the SA respectively remain the same as the MAC addresses of the wireless relay communication terminal 204, the wireless relay communication terminal 201, the communication terminal 301, and the wireless communication terminal 101.

Note that the form of AE=1 can also be taken even when wireless relay can be executed by the same wireless system. In this case, when transmitting data generated by the wireless communication terminal 101 to the wireless communication terminal 103 in FIG. 1, for example, the RA is the MAC address of the wireless relay communication terminal 202, the TA is the MAC address of the wireless relay communication terminal 201, the Relay DA is the MAC address of the wireless relay communication terminal 203, the Relay SA is the MAC address of the wireless relay communication terminal 201, the DA is the MAC address of the wireless communication terminal 103, and the SA is the MAC address of the wireless communication terminal 101, in a data frame which the wireless relay communication terminal 201 transmits to the wireless relay communication terminal 202.

When the address fields are allocated as shown in the row d in FIG. 7 by using the AE field as described above, data relay between wireless relay communication terminals and communication between a wireless relay communication terminal and a communication terminal connecting to the wireless relay communication terminal and having no relay function are hierarchically separated. The addresses of wireless relay communication terminals participating in data relay between wireless relay communication terminals are inserted into the first half of the address fields which are from Address 1 to Address 4 fields, and the addresses of communication terminals related to the data and having no relay function are inserted into the second half of the address fields which are Address 5 and Address 6 fields added by extension.

When AE=1, the address of a final wireless relay communication terminal is inserted into the Address 3 field. However, an appropriate address cannot be set if the address of the final wireless relay communication terminal is undetermined in a wireless relay communication terminal on the route of data relay. In this case, therefore, the information in the Address 1 field, i.e., the direct transmission destination address of a relay data frame is described in the Address 3 field.

Figure 8:
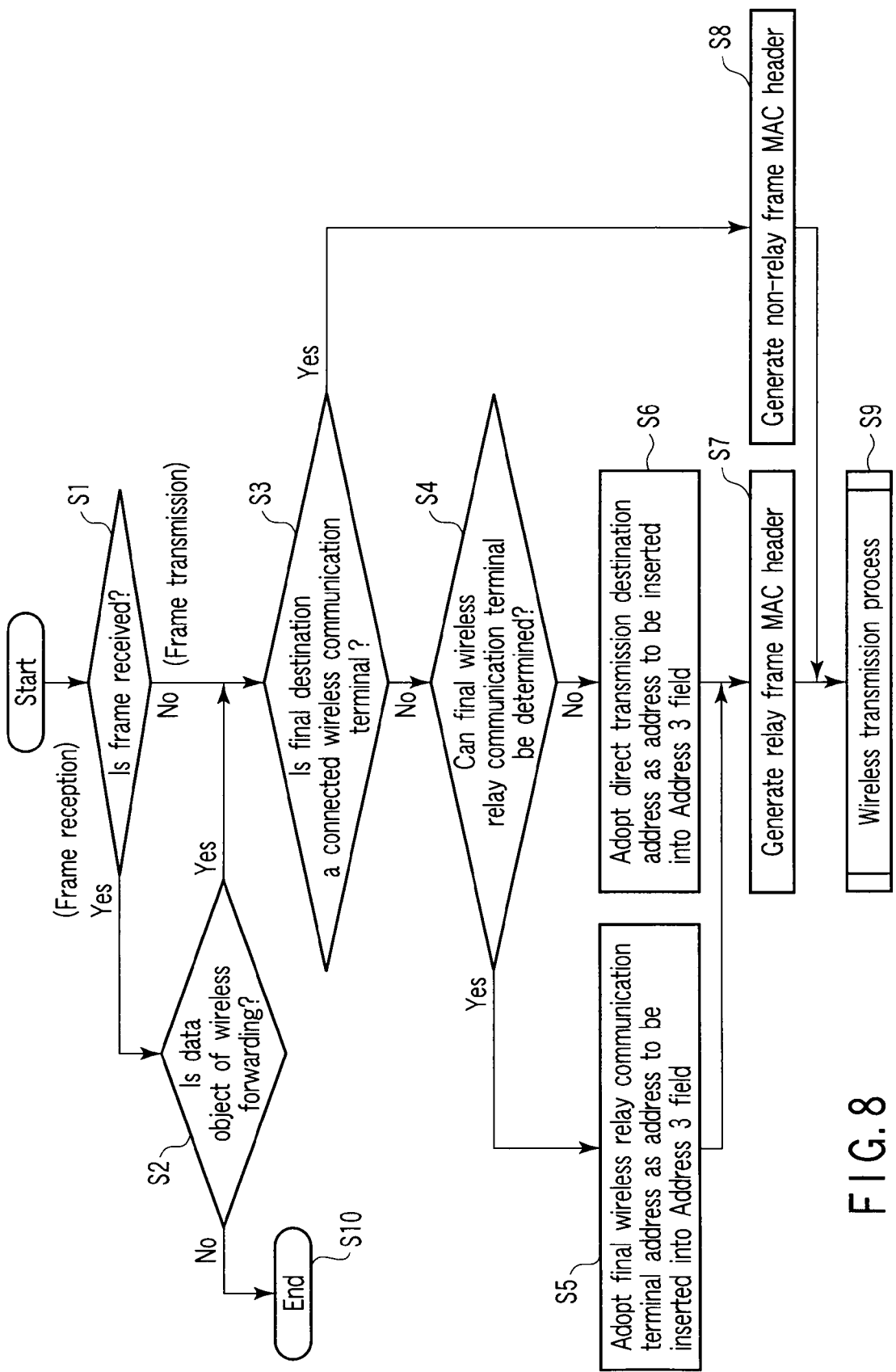
FIG. 8 is a flowchart for explaining the operation of a wireless relay communication terminal according to the first embodiment.

FIG. 8 is a flowchart for explaining the operation of a wireless relay communication terminal according to the first embodiment. FIG. 8 shows the operation of the transmission/reception controller 13 when the wireless relay communication terminal has received a frame or when the wireless relay communication terminal transmits internally generated data.

When a wireless relay communication terminal has received a frame addressed to the wireless relay communication terminal from another communication terminal (e.g., when the wireless relay communication terminal 201 has received a frame from the wireless communication terminal 101 or 102 or from the wireless relay communication terminal 202, when the wireless relay communication terminal 202 has received a frame from the wireless relay communication terminal 203 or 201, when the wireless relay communication terminal 203 has received a frame from the wireless relay communication terminal 202 or 204, or when the wireless relay communication terminal 204 has received a frame from the communication terminal 301 or wireless relay communication terminal 203 in FIG. 1), i.e., when a wireless relay communication terminal has received a frame in which the direct transmission destination address or RA contained in the Address 1 field (FIG. 4) is the wireless relay communication terminal, the process advances to step S1 related to a relay operation. In step S1, the process advances to step S2 because an object frame is the received frame.

In step S2, whether internal data (frame body shown in FIG. 4) of the received frame is data to be forwarded is determined. In step S2, the DA of the received frame is checked. That is, the address described in the Address 3 field is checked if AE=0 (if no Address 5 field is added in FIG. 6) as shown in the rows c and d in FIG. 7, and the address described in the Address 5 field is checked if AE=1 (if the Address 5 field is added in FIG. 6) as shown in the row e in FIG. 7. If the address (the DA of the received frame) is not the MAC address of the terminal having received the frame, the data in the received frame is data to be forwarded, so the process advances to step S3. If the address is the MAC address of the terminal having received the frame, the data in the received frame is not data to be forwarded, so the process advances to step S10 to terminate the processing.

"Forwarding" herein mentioned is to retransmit the received frame onto the wireless medium (air), and means both transmission to another wireless relay communication terminal, and transmission to a wireless communication terminal having no wireless relay function and connecting to the wireless relay communication terminal having received the frame.

In step S3, whether a wireless communication terminal at the final destination in the received frame is connected to the wireless relay communication terminal having received the frame is checked. In step S3, the wireless relay communication terminal refers to the address table (stored in the address table storage unit 14) registering the addresses of wireless communication terminals connected to the wireless relay communication terminal having received the frame, and checks whether there is the same address as the DA in the received frame among the addresses of the wireless communication terminals (including wireless communication terminals having no wireless relay function and the wireless relay communication terminals having a wireless relay function) connected to the wireless relay communication terminal having received the frame. As described previously, the DA in the received frame is the address described in the Address 3 field when AE=0 as shown in the rows c and d in FIG. 7 (when the Address 5 field shown in FIG. 6 is not added), and the address described in the Address 5 field when AE=1 as shown in the row e in FIG. 7 (when the Address 5 field is added in FIG. 6).

If it is determined in step S3 that the same address as the DA in the received frame is registered in the address table as the address of a wireless communication terminal (a wireless communication terminal having no wireless relay function or a wireless relay communication terminal) connected to the wireless relay communication terminal having received the frame, i.e., that the wireless communication terminal at the final destination in the received frame is connected to the wireless relay communication terminal having received the frame, the process advances to step S8.

In step S8, a MAC header not using (not including) the Relay Header field shown in FIG. 4 is generated, and the process advances to a wireless transmission process in step S9.

This MAC header not using (not including) the Relay Header field shown in FIG. 4 is called a non-relay frame MAC header. If the final destination is a wireless communication terminal having no wireless relay function and connecting to the wireless relay communication terminal having received the frame, the non-relay frame MAC header is the case where TODS=0 and FromDS=1 as shown in the row b in FIG. 7. If the final destination is another wireless relay communication terminal connecting to the wireless relay communication terminal having received the frame, the non-relay frame MAC header is the case where TODS=1, FromDS=1, and AE=0 as shown in the row d in FIG. 7.

In step S9, a frame as shown in FIG. 4 is generated by adding the Frame Body field included in the received frame and an FCS (Frame Check Sequence) field to the MAC header portion in, e.g., the IEEE802.11 wireless LAN system. Then, a series of transmission processes of transmitting the generated frame through the acquisition of the wireless medium (channel access) and the like are performed.

Assume that normal receiving processes performed when a frame is received are already executed before step S1 or after step S10. Examples of the processes are the setting of virtual carrier sense (Network Allocation Vector: NAV) in the IEEE802.11 wireless LAN, and the process of extracting data (the Frame Body portion shown in FIG. 4) from a frame whose final destination is a terminal having received the frame, and forwarding the data from the MAC layer to the upper layer such as the Logical Link Control (LLC) layer. Assume also that even when the frame is an object of not wireless forwarding but wired forwarding, these processes are already executed before step S1 or after step S10. This is the case where, for example, the wireless relay communication terminal 204 shown in FIG. 1 forwards data to the communication terminal 301. Note that the routing information stored in the address table storage unit 14 may also be used in this forwarding through wire as well.

If it is determined in step S3 that the same address as the DA of the received frame is not registered in the address table as the address of a wireless communication terminal (a wireless communication terminal having no wireless relay function or a wireless relay communication terminal) connecting to the wireless relay communication terminal having received the frame, i.e., that the wireless communication terminal at the final destination DA in the received frame is not connected to the wireless relay communication terminal having received the frame, the process advances to step S4 to start a process of relaying the received frame, i.e., a relay frame transmission process.

In step S4, whether a final wireless relay communication terminal can be determined (whether search for the route to the DA is completed or the final wireless relay communication terminal is uniquely determined for the DA) is checked. That is, in step S4, whether the routing information (the final destination DA, the address of the final wireless relay communication terminal connecting to the communication terminal corresponding to the DA, and the addresses of wireless relay communication terminals existing (on the route) from the final wireless relay communication terminal to the wireless relay communication terminal having received the frame) to the final destination, i.e., the DA, is registered in the address table is checked. If the final wireless relay communication terminal can be determined (if the routing information to the final destination (DA) is registered in the address table), the MAC address of the final wireless relay communication terminal is adopted as the address to be inserted into the Address 3 field (step S5). Then, the process advances to step S7 to generate a MAC header including the Relay Header field as shown in FIG. 4. In step S9, the wireless transmission process is performed.

The MAC header generated in step S7 is the case where ToDS=1, FromDS=1, and AE=1 as shown in the row e in FIG. 7.

If no final wireless relay communication terminal can be determined in step S4 (if the routing information to the final destination (DA) is not registered in the address table 14), the process advances to step S6.

In step S6, from other wireless relay communication terminals registered in the address table and connecting to the wireless relay communication terminal having received the frame, the address of a wireless relay communication terminal as the direct transmission destination of the relay frame (RA), i.e., the address to be inserted into the Address 1 field is selected and the same address is selected to be inserted in the Address 3 field. In step S6, if the direct transmission source TA of the frame received in step S1 is a wireless relay communication terminal, a wireless relay communication terminal except for the wireless relay communication terminal corresponding to the TA is selected from other wireless relay communication terminals registered in the address table and connecting to the wireless relay communication terminal having received the frame. If a plurality of wireless relay communication terminals are registered in the address table as the wireless relay communication terminals connecting to the wireless relay communication terminal having received the frame, relay frames containing the same data may be transmitted to those registered wireless relay communication terminals. It is also possible to select a wireless relay communication terminal as the transmission destination in accordance with another conventional method such as route search frame transmission.

In step S6 as described above, the RA to be inserted into the Address 1 field is also adopted as the address to be inserted into the Address 3 field.

Subsequently, the process advances to step S7 to generate a MAC header including the Relay Header field as shown in FIG. 4, and advances to the wireless transmission process in step S9. In step S7, a MAC header as shown in the row e in FIG. 7 is generated. This is the case where ToDS=1, FromDS=1, and AE=1. Since no final relay terminal can be determined, the same MAC address as the MAC address (RA) in the Address 1 field is inserted into the Address 3 field instead of the original Relay DA.

If data is transferred from the upper layer to the MAC layer (transmission/reception controller 13) in the wireless relay communication terminal in step S1, the process advances to step S3 to start a frame transmission process. This data can be data generated by the upper layer or data received by the upper layer. An example is the case where data from the communication terminal 301 is received by the wireless relay communication terminal 204 shown in FIG. 1 by communication through wire and forwarded to the MAC layer so as to be transmitted onto the wireless medium (by, e.g., the IEEE802.11 wireless LAN system).

Processing from step S3 is the same as the above-mentioned process of retransmitting the received frame onto the wireless medium. That is, if it is determined in step S3 by referring to the address table that the wireless communication terminal at the final destination DA of the transmission frame is connected to the wireless relay communication terminal having received the frame, the process advances to step S8 to generate a MAC header not including the Relay Header field shown in FIG. 4, and then advances to the wireless transmission process in step S9. If it is determined in step S3 that the wireless communication terminal at the final destination DA is not connected to the wireless relay communication terminal having received the frame, the process advances to step S4 to start the process of relaying the received frame, i.e., the relay frame transmission process.

In step S4, whether the routing information to the final destination, i.e., the DA, is registered in the address table is checked. If the final wireless relay communication terminal can be determined (if the routing information to the final destination (DA) is registered in the address table), this final wireless relay communication terminal is determined as the MAC address to be inserted into the Address 3 field (step S5). The process then advances to step S7 to generate a MAC header including the Relay Header field as shown in FIG. 4. And then in step S9, the wireless transmission process is performed.

If no final wireless relay communication terminal can be determined (if no routing information to the final destination (DA) is registered in the address table stored in the address table storage unit 14) in step S4, the process advances to step S6. In step S6, from other wireless relay communication terminals registered in the address table and connecting to the wireless relay communication terminal having received the frame, the address of a wireless relay communication terminal as the direct transmission destination of the transmission frame (RA), i.e., the address to be inserted into the Address 1 field is selected and the same address is selected to be inserted in the Address 3 field. In step S7, a MAC header including the Relay Header field as shown in FIG. 4 is generated. The process then advances to the wireless transmission process in step S9.

Note that this embodiment is not limited to the process sequence shown in the flowchart of FIG. 8. If the wireless relay communication terminal cannot determine the final wireless relay communication terminal, it is only necessary to transmit a frame (relay frame) in which the MAC address of a wireless relay communication terminal as the direct transmission destination (RA) is inserted into a field prepared to insert the MAC address of the final wireless relay communication terminal (Relay DA) (e.g., the Address 3 field shown in the row e in FIG. 7).

Note also that in the above first embodiment and in each of the following embodiments, an address field prepared to describe the address of the final wireless relay communication terminal is the Address 3 field. However, the present invention is not limited to this case. For example, the address field prepared to describe the address of the final wireless relay communication terminal may also be the Address 5 field or Address 6 field. In this case, "Address 3 field" need only be replaced with "Address 5 field" or "Address 6 field" in the explanation of the above first embodiment or each of the following embodiments. This makes the operation exactly the same as that when the address field prepared to describe the address of the final wireless relay communication terminal is the Address 3 field.

(Effects)

In the above first embodiment, the MAC address of a wireless relay communication terminal as the direct transmission source of a relay frame (RA) is inserted into a field prepared to insert the address of a final wireless relay communication terminal (e.g., the Address 3 field shown in the row e in FIG. 7). Accordingly, frame relay can be easily performed even in a situation in which the routing information to the final wireless relay communication terminal is undetermined (unregistered in the address table 14).

Second Embodiment

In the second embodiment, when performing multi-hop communication, a wireless relay communication terminal checks whether the address of the wireless relay communication terminal is set in an address field for the address of a final wireless relay communication terminal in a received frame.

Figure 9:
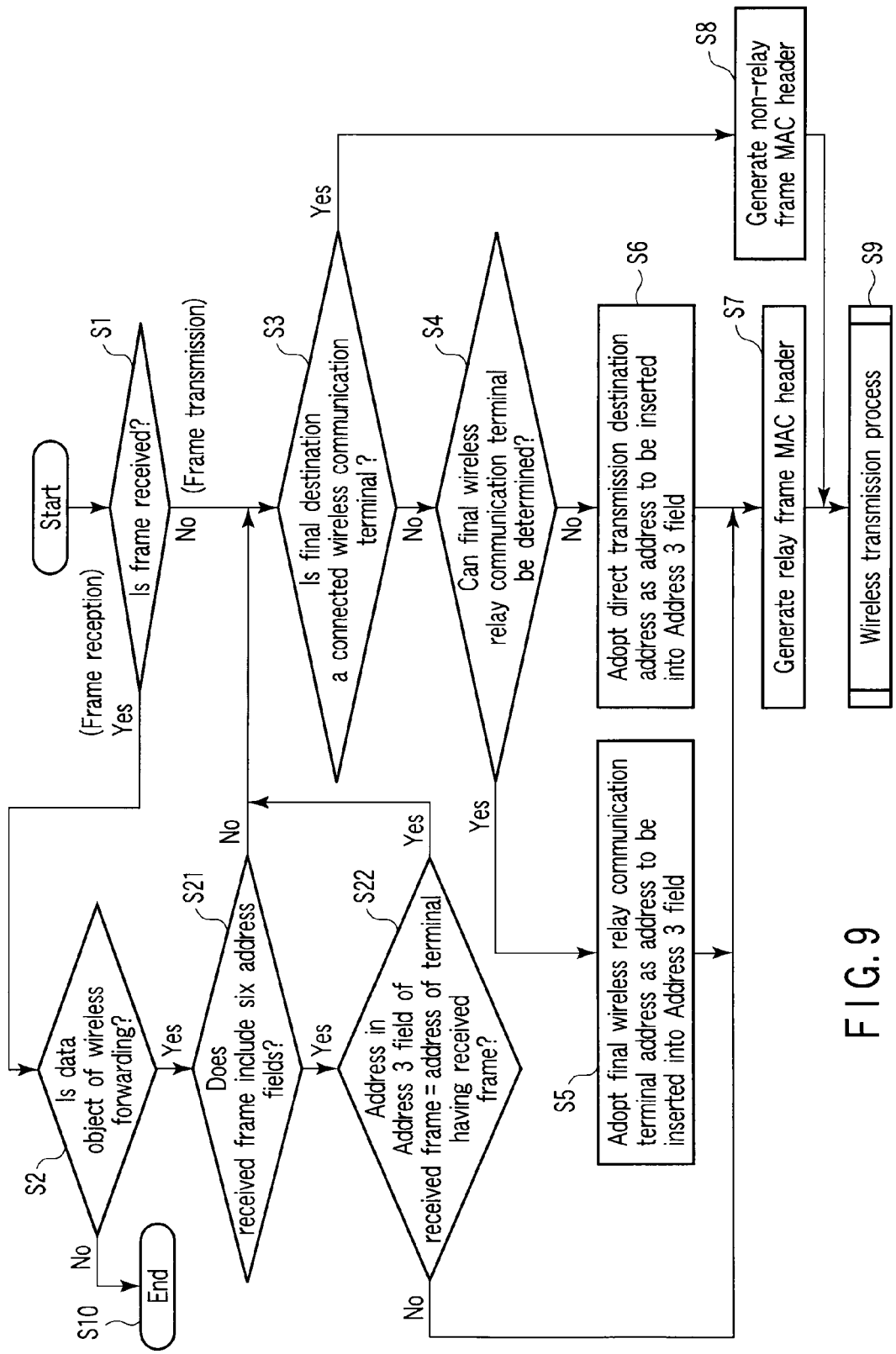
FIG. 9 is a flowchart for explaining the operation of a wireless relay communication terminal according to the second embodiment.

FIG. 9 is a flowchart for explaining the operation of a wireless relay communication terminal according to the second embodiment. FIG. 9 shows the operation of the transmission/reception controller 13 when the wireless relay communication terminal receives a frame and transmits internally generated data. Note that the same reference numerals as in FIG. 8 denote the same portions in FIG. 9, and different portions will be mainly explained below.

FIG. 9 differs from FIG. 8 in that steps S21 and S22 are added after step S2. If it is determined in step S2 that the final destination address (DA) of a received frame is not the MAC address of the terminal having received the frame, data in the received frame is data to be forwarded, so the process advances to step S21.

In step S21, whether the received frame includes the six address fields (the Address 1, 2, 3, and 4 fields in FIG. 4 and the Address 5 and 6 fields in FIG. 6) is checked. For example, whether AE=1 in the Relay Header field is checked. If AE=1, the received frame includes the six address fields. If the received frame includes the six address fields, the process advances to step S22; if not, the process advances to step S3.

In step S22, whether the address in the Address 3 field (the Relay DA in the Address 3 field in the row e in FIG. 7) of the received frame is the address of the wireless relay communication terminal having received the frame is checked.

In this case, the direct transmission destination address (RA) contained in the Address 1 field (FIG. 4) of the received frame is the wireless relay communication terminal having received the frame (step S1). Also, if the address in the Address 3 field is the address of the wireless relay communication terminal having received the frame (step S22), this is the case where ToDS=1, FromDS=1, and AE=1 in the row e in FIG. 7, indicating that the Address 1 field and the Address 3 field contain the MAC address of the wireless relay communication terminal having received the frame.

If it is determined in step S2 that the data in the received frame is data to be forwarded, whether the frame has the frame structure of a relay frame is checked in step S21. For example, if the wireless communication terminal 101 transmits data whose final destination is the wireless communication terminal 103 to the wireless relay communication terminal 201 in FIG. 1, the wireless relay communication terminal 201 receives the frame in which TODS=1 and FromDS=0 shown in the row c in FIG. 7. Since this frame does not include the Address 5 field (and the Address 6 field), the process advances to step S3. In step S3, it is determined that the DA in the Address 3 field is the address of the wireless communication terminal 103 and the wireless communication terminal 103 is not directly connected to the wireless relay communication terminal 201, so the process advances to step S4. In step S4, if the wireless relay communication terminal 201 can find out that the wireless communication terminal 103 is connected to the wireless relay communication terminal 203 from the address table stored in the address table storage unit 14 of the wireless relay communication terminal 201, the wireless relay communication terminal 201 determines the address of the wireless relay communication terminal 203 as the address (Relay DA) of a final wireless relay communication terminal to be inserted into the Address 3 field (step S5). Then, the process advances to step S7.

In step S7, a MAC header having a configuration shown in a row a in FIG. 10 is generated. That is, a relay frame in which ToDS=1, FromDS=1, AE=1, the MAC address of the wireless relay communication terminal 202 is inserted into the Address 1 field, the MAC address of the wireless relay communication terminal 201 is inserted into the Address 2 field, the MAC address of the wireless relay communication terminal 203 is inserted into the Address 3 field, the MAC address of the wireless relay communication terminal 201 is inserted into the Address 4 field, the MAC address of the wireless communication terminal 103 is inserted into the Address 5 field, and the MAC address of the wireless communication terminal 101 is inserted into the Address 6 field is generated and transmitted onto the wireless medium (step S9).

In step S4, if the wireless relay communication terminal 201 cannot find out that the wireless communication terminal 103 is connected to the wireless relay communication terminal 203 from the address table stored in the address table storage unit 14 of the wireless relay communication terminal 201, the process advances to step S6.

In step S6, the MAC address of the wireless relay communication terminal 202 directly connected to the wireless relay communication terminal 201 is acquired from the address table, and selected as the address of the final wireless relay communication terminal, i.e., as the value of the Address 3 field of the six address fields. After that, the process advances to step S7.

In step S7, a MAC header having a configuration shown in a row a in FIG. 11 is generated. That is, a relay frame in which ToDS=1, FromDS=1, AE=1, the MAC address of the wireless relay communication terminal 202 is inserted into the Address 1 field, the MAC address of the wireless relay communication terminal 201 is inserted into the Address 2 field, the MAC address of the wireless relay communication terminal 202 is inserted into the Address 3 field, the MAC address of the wireless relay communication terminal 201 is inserted into the Address 4 field, the MAC address of the wireless communication terminal 103 is inserted into the Address 5 field, and the MAC address of the wireless communication terminal 101 is inserted into the Address 6 field is generated (step S7) and transmitted onto the wireless medium (step S9).

The wireless relay communication terminal 202 having received the transmitted frame advances from step S1 to steps S2 and S21. Since it is determined in step S21 that the received frame includes the six address fields, the process advances to step S22. If it is determined in step S22 that the Address 3 field of the received frame does not contain the MAC address of the wireless relay communication terminal 202, the process advances to step S7. In this case, the MAC address designated in the Address 3 field of the frame received in step S1 is directly adopted in the Address 3 field of a relay frame generated in step S7.

In the above-mentioned example in which the wireless communication terminal 101 transmits the data whose final destination is the wireless communication terminal 103 to the wireless relay communication terminal 201 in FIG. 1, if the wireless relay communication terminal 201 transmits the relay frame as shown in the row a in FIG. 10, the MAC address of the wireless relay communication terminal 203 described in the Address 3 field is directly used in a relay frame transmitted by the wireless relay communication terminal 202 having received the former relay frame. That is, as shown in a row b in FIG. 10, in the relay frame transmitted by the wireless relay communication terminal 202, ToDS=1, FromDS=1, AE=1, the Address 1 field contains the MAC address of the wireless relay communication terminal 203, the Address 2 field contains the MAC address of the wireless relay communication terminal 202, the Address 3 field contains the MAC address of the wireless relay communication terminal 203, the Address 4 field contains the MAC address of the wireless relay communication terminal 201, the Address 5 field contains the MAC address of the wireless communication terminal 103, and the Address 6 field contains the MAC address of the wireless communication terminal 101.

If it is determined in step S22 that the Address 3 field of the received frame contains the MAC address of the terminal having received the frame, the process advances to step S3. In the above-mentioned example in which the wireless communication terminal 101 transmits the data whose final destination is the wireless communication terminal 103 to the wireless relay communication terminal 201 in FIG. 1, if the wireless relay communication terminal 201 transmits the relay frame as shown in the row a in FIG. 11, the value described in the Address 3 field of the relay frame transmitted from the wireless relay communication terminal 201 is the MAC address of the wireless relay communication terminal 202 (step S22), so the process advances to step S3. Since the wireless communication terminal 103 described in the Address 5 field is not directly connected to the wireless relay communication terminal 202 (step S3), the process advances to step S4. In step S4, if the wireless relay communication terminal 202 can find out from the address table stored in the address table storage unit 14 that the wireless communication terminal 103 is connected to the wireless relay communication terminal 203, the process advances to steps S5 and S7. A relay frame as shown in a row b in FIG. 11 in which ToDS=1, FromDS=1, AE=1, the Address 1 field contains the MAC address of the wireless relay communication terminal 203, the Address 2 field contains the MAC address of the wireless relay communication terminal 202, the Address 3 field contains the MAC address of the wireless relay communication terminal 203, the Address 4 field contains the MAC address of the wireless relay communication terminal 201, the Address 5 field contains the MAC address of the wireless communication terminal 103, and the Address 6 field contains the MAC address of the wireless communication terminal 101 is generated and transmitted. In step S4, even if the wireless relay communication terminal 202 cannot find out from the address table stored in the address table storage unit 14 that the wireless communication terminal 103 is connected to the wireless relay communication terminal 203, the process advances to step S6 and the wireless relay communication terminal 202 selects the wireless relay communication terminal 203 as the direct transmission destination address (RA) and selects the MAC address of the wireless relay communication terminal 203 also as the MAC address of the Address 3 field. Then, the process advances to step S7, resulting in the case shown in the row b in FIG. 11.

Furthermore, if the wireless relay communication terminal 203 has received the relay frame as shown in the rows b in FIGS. 10 and 11, the wireless relay communication terminal 203 advances from step S1 to steps S2, S21, and S22. Since it is determined in step S22 that the Address 3 field of the received frame contains the MAC address of the wireless relay communication terminal 203, the process advances to step S3.

In step S3, it is determined that the MAC address of the wireless communication terminal 103 described in the Address 5 field is registered in the address table stored in the address table storage unit 14 of the wireless relay communication terminal 203, i.e., that the wireless communication terminal 103 is wirelessly connected to the wireless relay communication terminal 203, the process advances to step S8.

In step S8, the MAC header shown in the row b in FIG. 7 is generated. That is, as shown in rows c in FIGS. 10 and 11, a non-relay frame MAC header in which ToDS=0, FromDS=1, the Address 1 field contains the MAC address of the wireless communication terminal 103, the Address 2 field contains the MAC address of the wireless relay communication terminal 203, and the Address 3 field contains the MAC address of the wireless communication terminal 101 extracted from the Address 6 field in the received relay frame shown in the rows b in FIGS. 10 and 11 is generated. In the generated non-relay frame MAC header, neither the Address 5 field nor the Address 6 field exists, and the Address 4 field is N/A.

The non-relay frame generated in step S8 is transmitted onto the wireless medium through step S9.

In the above example, when the wireless communication terminal 101 shown in FIG. 1 transmits the data whose final destination is the wireless communication terminal 103 to the wireless relay communication terminal 201, the wireless relay communication terminal 201 (the first wireless relay communication terminal) cannot determine the final wireless relay communication terminal (e.g., the wireless relay communication terminal 203 in this case). As shown in the row a in FIG. 11, therefore, the Address 3 field of the relay frame contains the MAC address of the wireless relay communication terminal 202 connected to the wireless relay communication terminal 201. However, the wireless relay communication terminal 202 (the second wireless relay communication terminal) having received this relay frame can determine the final wireless relay communication terminal (wireless relay communication terminal 203). As shown in the row b in FIG. 11, therefore, a relay frame in which the address in the Address 3 field is rewritten by the MAC address of the final wireless relay communication terminal (wireless relay communication terminal 203) is transmitted.

In the second embodiment as described above, when the second wireless relay communication terminal receives a relay frame which is transmitted from the first wireless relay communication terminal and in which the address of a final wireless relay communication terminal is not set in an address field for the address of a final wireless relay communication terminal, and if the second wireless relay communication terminal can determine the address of the final wireless relay communication terminal, the second wireless relay communication terminal updates the address in this address field to the address of the final wireless relay communication terminal.

The process sequence is not limited to that shown in the flowchart of FIG. 9, provided that the configuration as described above is achieved.

If the second wireless relay communication terminal can determine the final wireless relay communication terminal in step S4 through step S22 shown in FIG. 9, the routing information (e.g., the final destination DA, the address of the final wireless relay communication terminal connecting a communication terminal corresponding to the DA, and the addresses of wireless relay communication terminals existing from the final wireless relay communication terminal to the wireless relay communication terminal having received the frame, or at least the address of the final wireless relay communication terminal) to the final wireless relay communication terminal stored in the address table storage unit 14 of the second wireless relay communication terminal may also be transmitted to the wireless relay communication terminal having transmitted the relay frame received in step S1 (i.e., the first wireless relay communication terminal having failed to determine the final wireless relay communication terminal).

(Effects)

In the above second embodiment, if a wireless relay communication terminal having received a frame determines that the address of the wireless relay communication terminal is set in a field (e.g., the Address 3 field) prepared for the address of a final wireless relay communication terminal of the relay frame, and that a terminal at an address described in a field (e.g., the Address 1 field) prepared for the address of a final destination terminal is not a terminal connected to the wireless relay communication terminal, the wireless relay communication terminal updates the address in the above Address 3 field, if possible, by the address of the final wireless relay communication terminal on the basis of relay information held in the wireless relay communication terminal, and transmits the relay frame. Accordingly, even when the relay frame is transmitted while the routing information to the final destination is undetermined, frame relay can be continued to the final destination via the final wireless relay communication terminal.

Also, when a wireless relay communication terminal relays a frame after extrapolating a field prepared for the final wireless relay communication terminal of the relay frame, the routing information (e.g., the final destination DA, the address of the final wireless relay communication terminal connecting a communication terminal corresponding to the DA, and the addresses of wireless relay communication terminals existing from the final wireless relay communication terminal to the wireless relay communication terminal having received the relay frame, or at least the address of the final wireless relay communication terminal) used in the extrapolation is transmitted to a wireless relay communication terminal as the direct transmission source of the received relay frame. This makes it possible to efficiently notify newer relay information to the wireless relay communication terminal as the direct transmission source of the relay frame. Consequently, the relay function can be implemented even in a situation in which a wireless relay communication terminal holding old routing information exists.

Third Embodiment

FIG. 12 is a flowchart for explaining the operation of a wireless relay communication terminal according to the third embodiment. FIG. 12 shows the operation of the transmission/reception controller 13 when the wireless relay communication terminal receives a frame and transmits internally generated data. Note that the same reference numerals as in FIGS. 8 and 9 denote the same portions in FIG. 12, and different portions will be mainly explained.

FIG. 12 differs from FIG. 9 in that step S23 is added as processing performed if an address field for the address of a final wireless relay communication terminal (e.g., the Address 3 field in this case) in a received frame does not contain the address of the wireless relay communication terminal having received the frame (i.e., if NO in step S22).

In step S23, whether to update the address of the final wireless relay communication terminal in the received relay frame is determined. If YES in step S23, the process advances to step S5 to determine the new address of the final wireless relay communication terminal as the address to be inserted into the Address 3 field. Then, the process advances to step S7, and a relay frame MAC header is generated and transmitted onto the wireless medium as described previously (step S9).

That is, even when the Address 3 field in the received relay frame contains the address of the final wireless relay communication terminal, if the contents of the address table of the wireless relay communication terminal that transmitted this relay frame are old, this final wireless relay communication terminal address may have been changed to another final wireless relay communication terminal address. If this is the case in the third embodiment, the wireless relay communication terminal finds out that the address of the final wireless relay communication terminal in the received relay frame differs from the address of the final wireless relay communication terminal obtained from the routing information held in the wireless relay communication terminal having received the frame, and corrects the address to the new address.

Similarly to the second embodiment, the third embodiment will be explained by taking the case where the wireless communication terminal 101 transmits data whose final destination is the wireless communication terminal 103 in FIG. 1 as an example. For example, when the wireless relay communication terminal 201 transmits the relay frame as shown in the row a in FIG. 10, the wireless relay communication terminal 202 having received this relay frame determines in step S23 whether to update the MAC address of the wireless relay communication terminal 203 described in the Address 3 field of the relay frame.

In step S23, the wireless relay communication terminal 202 first extracts the address of a final relay terminal (Relay DA) from, e.g., the Address 3 field of the received relay frame, and extracts the address of a final destination terminal (DA) from, e.g., the Address 5 field. In this case, the MAC address of the wireless communication terminal 103 is extracted as the DA. If the address of a wireless relay communication terminal (e.g., the wireless relay communication terminal 203 in this case) connected to the wireless communication terminal 103 as the DA is registered in the address table stored in the address table storage unit 14 of the wireless relay communication terminal 202, the address of the wireless relay communication terminal 203 is compared with the address of the final relay terminal (Relay DA) extracted from the Address 3 field of the relay frame. If the two addresses are different, it is determined to update the address in the Address 3 field. If the two addresses match (if the address in the Address 3 field is not to be updated), the process advances to step S7.

If YES in step S23, the process advances to step S5, and the address of the wireless relay communication terminal (in this case, the wireless relay communication terminal 203) registered in the address table of the wireless relay communication terminal 202 and connected to the wireless communication terminal 103 as the DA is determined as a new address to be inserted into the Address 3 field, instead of the MAC address of the wireless relay communication terminal presently set in the Address 3 field.

Note that in this example, the address of the final wireless relay communication terminal inserted by the wireless relay communication terminal 201 is the address of the wireless relay communication terminal 203, and the wireless communication terminal 103 as the final destination terminal is connected to the wireless relay communication terminal 203, so it is unnecessary to update the address of the final wireless relay communication terminal inserted by the wireless relay communication terminal 201. Accordingly, the process advances from step S23 to step S7 to transmit the relay frame shown in the row b in FIG. 10 as in the second embodiment.

The case where it is necessary to correct the address of a final wireless relay communication terminal will be explained below with reference to FIG. 13.

Figure 13:
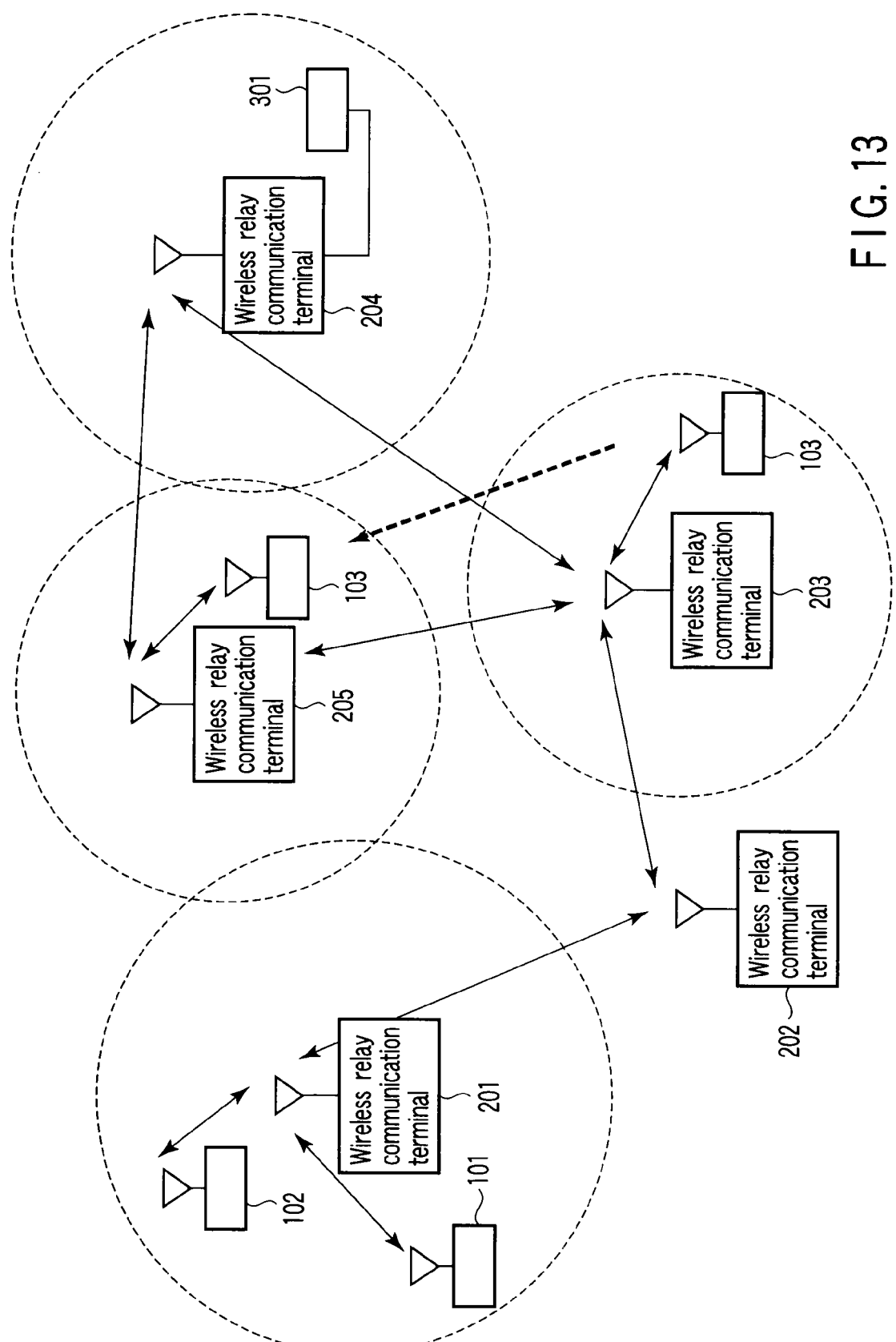
FIG. 13 is a view for explaining the case where it is necessary to correct the address of a final wireless relay communication terminal.

Assume that the wireless communication terminal 101 transmits data whose final destination is the wireless communication terminal 103 in FIG. 13. When the wireless relay communication terminal 201 transmits a relay frame to the wireless relay communication terminal 202, the wireless communication terminal 103 as the final destination terminal is connected to the wireless relay communication terminal 203. Therefore, the wireless relay communication terminal 201 transmits the relay frame shown in the row a in FIG. 10 to the wireless relay communication terminal 202.

The wireless relay communication terminal 202 having received this relay frame checks the routing information in step S23 to find a wireless relay communication terminal to which the wireless communication terminal 103 as the DA is connected. At this point, the wireless communication terminal 103 is already connected to another wireless relay communication terminal 205, and information indicating that the wireless relay communication terminal 203 is connected to the wireless relay communication terminal 205 and the wireless communication terminal 103 is connected to the wireless relay communication terminal 205 is registered in the address table of the wireless relay communication terminal 202. Accordingly, the wireless relay communication terminal 202 corrects the address of a final wireless relay communication terminal in the received relay frame from the address of the wireless relay communication terminal 203 to that of the wireless relay communication terminal 205 (step S5).

Figures 14, 22:
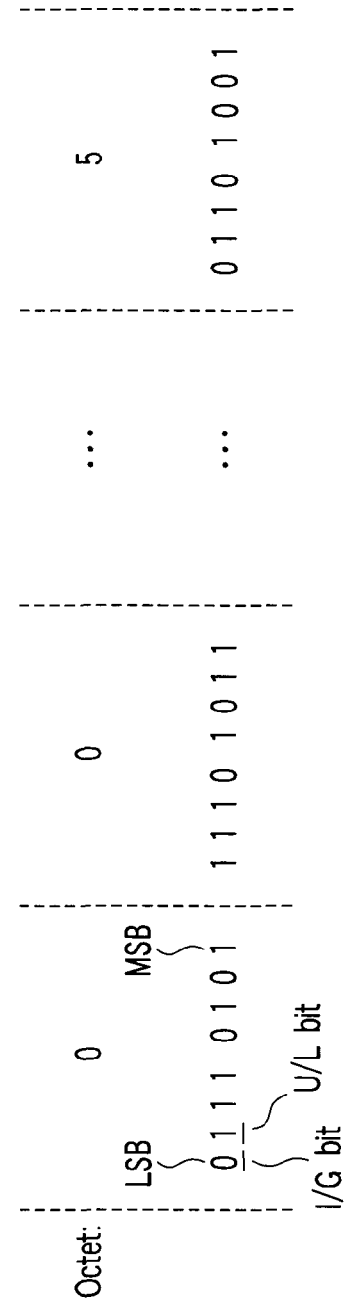
FIG. 14 is a view showing a practical example of the address fields of the MAC header in which the address of the final wireless relay communication terminal is corrected.
FIG. 22 is a view for explaining the address of a wireless communication terminal.

That is, as shown in a row a in FIG. 14, the wireless relay communication terminal 202 transmits a relay frame in which ToDS=1, FromDS=1, AE=1, the Address 1 field contains the MAC address of the wireless relay communication terminal 203, the Address 2 field contains the MAC address of the wireless relay communication terminal 202, the Address 3 field contains the MAC address of the wireless relay communication terminal 205, the Address 4 field contains the MAC address of the wireless relay communication terminal 201, the Address 5 field contains the MAC address of the wireless communication terminal 103, and the Address 6 field contains the MAC address of the wireless communication terminal 101.

Note that the wireless relay communication terminal 202 is not directly wirelessly connected to the wireless relay communication terminal 205. If they are directly connected, however, as shown in FIG. 14(*b*), a relay frame in which the Address 1 field contains the MAC address of the wireless relay communication terminal 205 is transmitted.

The event as shown in FIG. 13 occurs in, e.g., the following case. If a wireless relay communication terminal is a power saving terminal and has not received routing information because the terminal was in a sleep state when the routing information was updated on a wireless relay system, the terminal uses the routing information older than that of another wireless relay communication terminal on the wireless relay system when transmitting a relay frame. In addition, if the wireless communication terminal 103 shown in FIG. 13 changes the connection from the wireless relay communication terminal 203 to the wireless relay communication terminal 205 immediately after a relay frame is transmitted to the next wireless relay communication terminal (i.e., reassociation with the wireless relay communication terminal 205 in the IEEE802.11 wireless LAN system), the routing information cannot be updated in time for transmission of the relay frame on the wireless relay system. As a consequence, the relay frame is transmitted by using the old routing information.

Note that this embodiment is not limited to the process sequence shown in the flowchart of FIG. 12. It is only necessary to be able to finally correct the address of a final wireless relay communication terminal in a relay frame received by a wireless relay communication terminal to a new address.

In the third embodiment as described above, a second wireless relay communication terminal having received a relay frame which is transmitted from a first wireless relay communication terminal and in which the address of a final wireless relay communication terminal is set in an address field for the address of a final wireless relay communication terminal corrects the address of the final wireless relay communication terminal to a new address.

If the second wireless relay communication terminal determines in step S23 of FIG. 12 to update the address of the final wireless relay communication terminal in the received relay frame, the routing information (e.g., the final destination DA, the address of the final wireless relay communication terminal connecting a communication terminal corresponding to the DA, and the addresses of wireless relay communication terminals existing from the final wireless relay communication terminal to the wireless relay communication terminal having received the frame, or at least the address of the final wireless relay communication terminal) in the address table stored in the address table storage unit 14 of the second wireless relay communication terminal may also be transmitted to the first wireless relay communication terminal having transmitted the relay frame.

(Effects)

In the third embodiment described above, if the address of a final wireless relay communication terminal in a received relay frame differs from the address of a final wireless relay communication terminal held in a wireless relay communication terminal having received the frame (e.g., if the address of the final wireless relay communication terminal held in the wireless relay communication terminal having received the frame is newer than the address of the final wireless relay communication terminal set in the received relay frame), the wireless relay communication terminal having received the frame updates the address in a field prepared for the final wireless relay communication terminal of the relay frame with the address of the final wireless relay communication terminal held in the wireless relay communication terminal having received the obtained frame as a relay frame. Consequently, even if the routing information in the address table of the transmission source of the relay frame is old, each wireless relay communication terminal before the final destination relays the frame after updating the address of the final wireless relay communication terminal in accordance with the newest routing information. Accordingly, the relay frame can be delivered to a communication terminal at the final destination.

Also, since each wireless relay communication terminal via which the frame is relayed before arriving at the final destination communication terminal checks the routing information, the relay information can be appropriately updated. In addition, the relay function can be implemented even in a situation in which a wireless relay communication terminal holding old routing information (e.g., a power saving relay terminal) exists.

Furthermore, when a wireless relay communication terminal having received a relay frame updates the address in a field prepared in the relay frame for the address of a final wireless relay communication terminal, the wireless relay communication terminal having received the frame transmits routing information used in the update to a wireless relay communication terminal as the direct transmission source of the received relay frame. This makes it possible to efficiently notify newer routing information to the wireless relay communication terminal as the direct transmission source of the relay frame. Therefore, the relay function can be implemented even in a situation in which a wireless relay communication terminal holding old routing information (e.g., a power saving relay terminal) exists.

Fourth Embodiment

Figure 15:
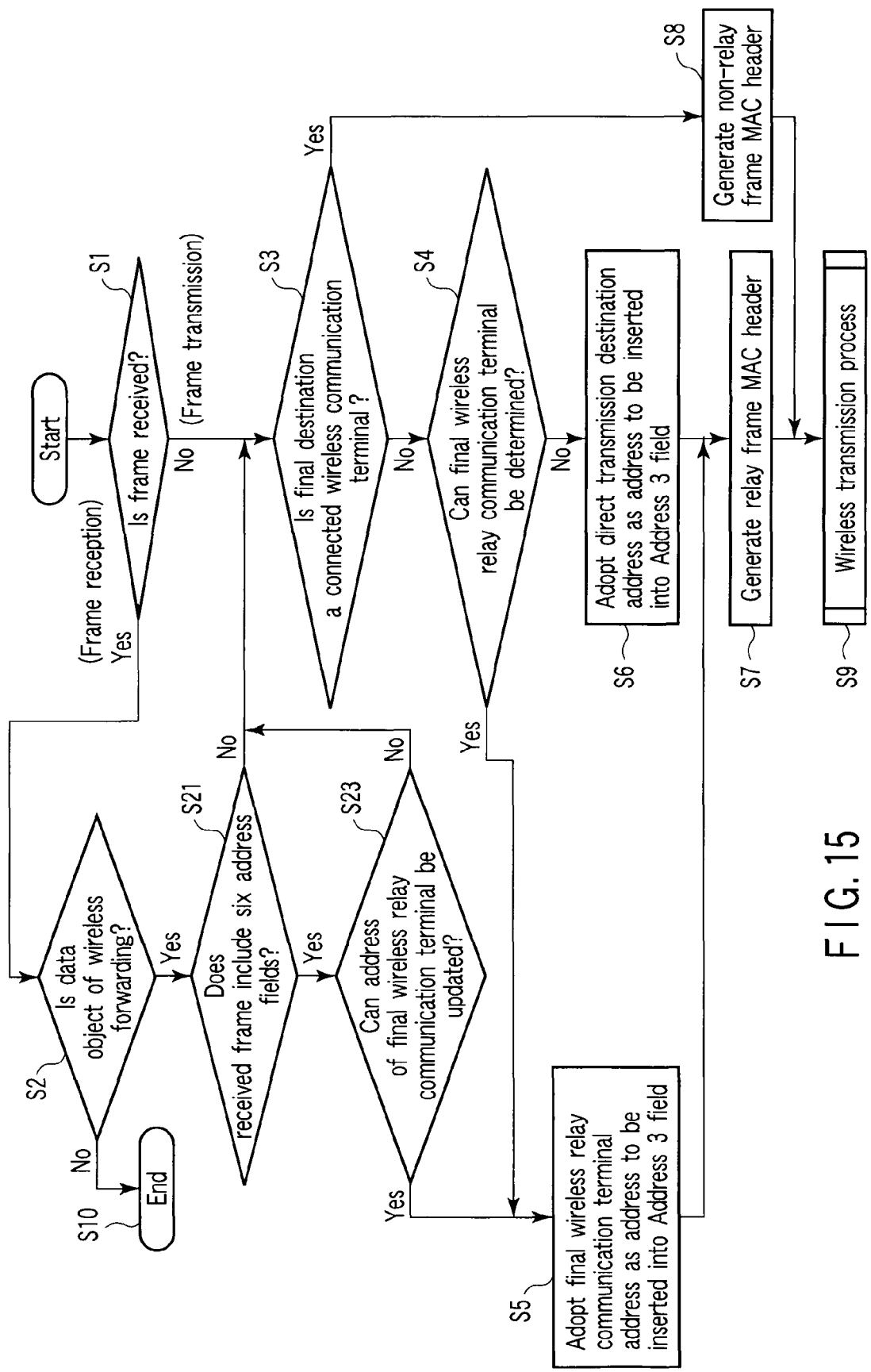
FIG. 15 is a flowchart for explaining the operation of a wireless relay communication terminal according to the fourth embodiment.

FIG. 15 is a flowchart for explaining the operation of a wireless relay communication terminal according to the fourth embodiment. FIG. 15 shows the operation of the transmission/reception controller 13 when the wireless relay communication terminal receives a frame and transmits internally generated data. Note that the same reference numerals as in FIGS. 8, 9, and 12 denote the same portions in FIG. 15, and different portions will be mainly explained below.

Step S22 in FIG. 12 (the process of checking whether the address in an address field describing the address of a final wireless relay communication terminal (e.g., the Address 3 field in this case) in a received frame matches the address of a wireless relay communication terminal having received the frame) is deleted from FIG. 15. That is, in FIG. 15, if it is determined in step S21 that the received frame is a relay frame including the six address fields, the process immediately advances to step S23 to determine whether to update the address of a final wireless relay communication terminal in the received relay frame.

Similarly to the third embodiment, if it is determined in step S23 to update the address of the final wireless relay communication terminal in the Address 3 field of the received relay frame, the process advances to step S5 to determine the new address of the final wireless relay communication terminal as the address to be inserted into the Address 3 field. Then, the process advances to step S7 to generate a MAC header of a relay frame and to transmit it onto the wireless medium (step S9) in the same manner as described previously. For example, it is determined to update the address if the address in a field prepared in the relay frame for the address of a final wireless relay communication terminal differs from the address of a final wireless relay communication terminal obtained from the routing information held in the wireless relay communication terminal having received the frame. It is also possible to determine to update the address if the address of the final wireless relay communication terminal obtained from the routing information held in the wireless relay communication terminal having received the frame is newer than the address in the field prepared in the relay frame for the address of the final wireless relay communication terminal.

If it is determined in step S23 not to update the address in the Address 3 field, the process advances to step S3.

Similarly to the first embodiment, if it is determined in step S3 by referring to the address table that a wireless communication terminal at the final destination DA in the received frame is connected to the wireless relay communication terminal having received the frame, the process advances to step S8 to generate a MAC header not including the Relay Header field shown in FIG. 4. After that, the process advances to the wireless transmission process in step S9.

If it is determined in step S3 that the communication terminal at the final destination DA is not connected to the wireless relay communication terminal having received the frame, the process advances to step S4.

If a final wireless relay communication terminal can be determined for the final destination (DA) in step S4, the MAC address of this final wireless relay communication terminal is selected as the address to be inserted into the Address 3 field (step S5). Then, a MAC header including the Relay Header field as shown in FIG. 4 is generated (step S7), and the wireless transmission process is performed in step S9.

If no final wireless relay communication terminal can be determined in step S4, the address of a wireless relay communication terminal selected as the direct transmission destination of the relay frame from the wireless relay communication terminals registered in the address table and connected to the wireless relay communication terminal having received the frame, is also selected as the address to be inserted into the Address 3 field (step S6). Then, a MAC header as shown in the row e in FIG. 7 is generated (step S7), and a transmission frame is generated and transmitted onto the wireless medium (step S9).

Note that in step S4 of this embodiment, it is determined that the address of the final wireless relay communication terminal can be determined if the Address 3 field of the received frame contains not the address of the wireless relay communication terminal having received the frame, but the address of an arbitrary wireless relay communication terminal.

Note also that this embodiment is not limited to the process sequence shown in the flowchart of FIG. 15. It is only necessary to be able to correct the address of a final wireless relay communication terminal in a relay frame received by a wireless relay communication terminal to a new address.

(Effects)

In the above fourth embodiment, if the address in a field prepared in a relay frame for the address of a final wireless relay communication terminal differs from the address of a final wireless relay communication terminal obtained from routing information held in a wireless relay communication terminal having received the frame (furthermore, if, for example, the address of the final wireless relay communication terminal obtained from the routing information held in the wireless relay communication terminal having received the frame is newer than the address in the field), the wireless relay communication terminal having received the frame updates the address in the field of the relay frame with the address of the final wireless relay communication terminal selected by the wireless relay communication terminal having received the frame, and transmits the frame as a relay frame. Consequently, even if the routing information on the address table of the transmission source of the relay frame is old, each wireless relay communication terminal before the final destination can relay the frame after updating the address of the final wireless relay communication terminal in accordance with the newest routing information. Accordingly, the relay frame can be delivered to the wireless communication terminal at the final destination.

Also, since each wireless relay communication terminal via which the frame is relayed before arriving at the final destination communication terminal checks the routing information, the relay information can be appropriately updated. In addition, the relay function can be implemented even in a situation in which a wireless relay communication terminal holding old routing information (e.g., a power saving relay terminal) exists.

Fifth Embodiment

The fifth embodiment will principally explain differences from the first to fourth embodiments. This embodiment differs from the first to fourth embodiments in that if no final wireless relay communication terminal can be determined, a specific value is set instead of the direct transmission destination address (RA) as the value of the Address 3 field in the MAC header of a relay frame.

Figure 16:
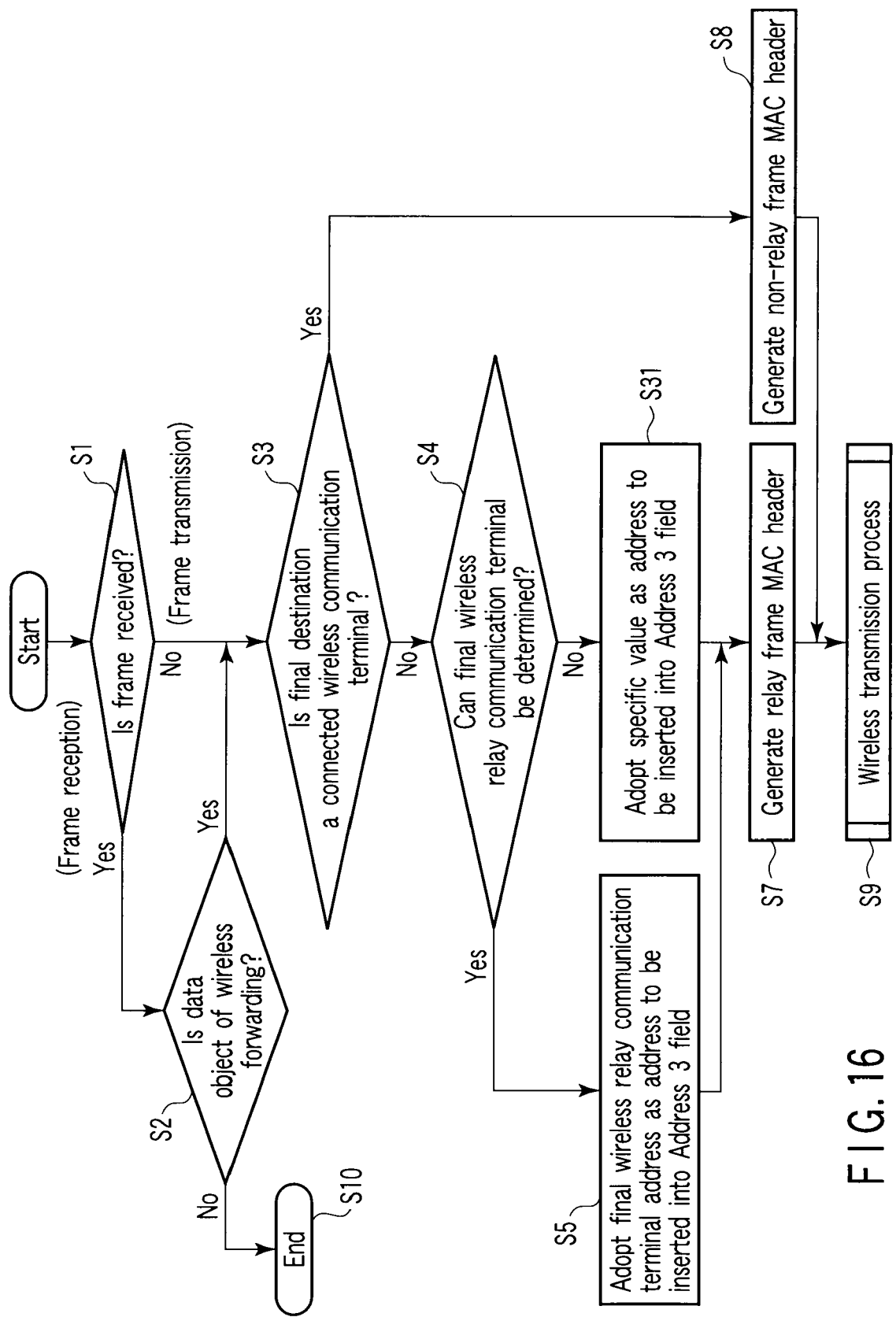
FIG. 16 is a flowchart for explaining the operation of a wireless relay communication terminal according to the fifth embodiment.

FIG. 16 is a flowchart for explaining the operation of a wireless relay communication terminal according to the fifth embodiment. FIG. 16 shows the operation of the transmission/reception controller 13 when the wireless relay communication terminal receives a frame and transmits internally generated data. Note that the same reference numerals as in FIG. 8 denote the same portions in FIG. 16, and different portions will be mainly explained below.

That is, step S6 in FIG. 8 is replaced with step S31 in FIG. 16. In step S6 of FIG. 8, if the wireless relay communication terminal cannot determine the final wireless relay communication terminal (NO in step S4), the address of the direct transmission destination (RA) is inserted into the Address 3 field for the address of the final wireless relay communication terminal in the relay frame. In step S31 of FIG. 16, however, if the wireless relay communication terminal cannot determine the final wireless relay communication terminal (NO in step S4), a predetermined value (specific value) is inserted into the Address 3 field.

Note that it is also possible to replace step S6 in FIG. 15 with step S31 in FIG. 16.

Figure 17:
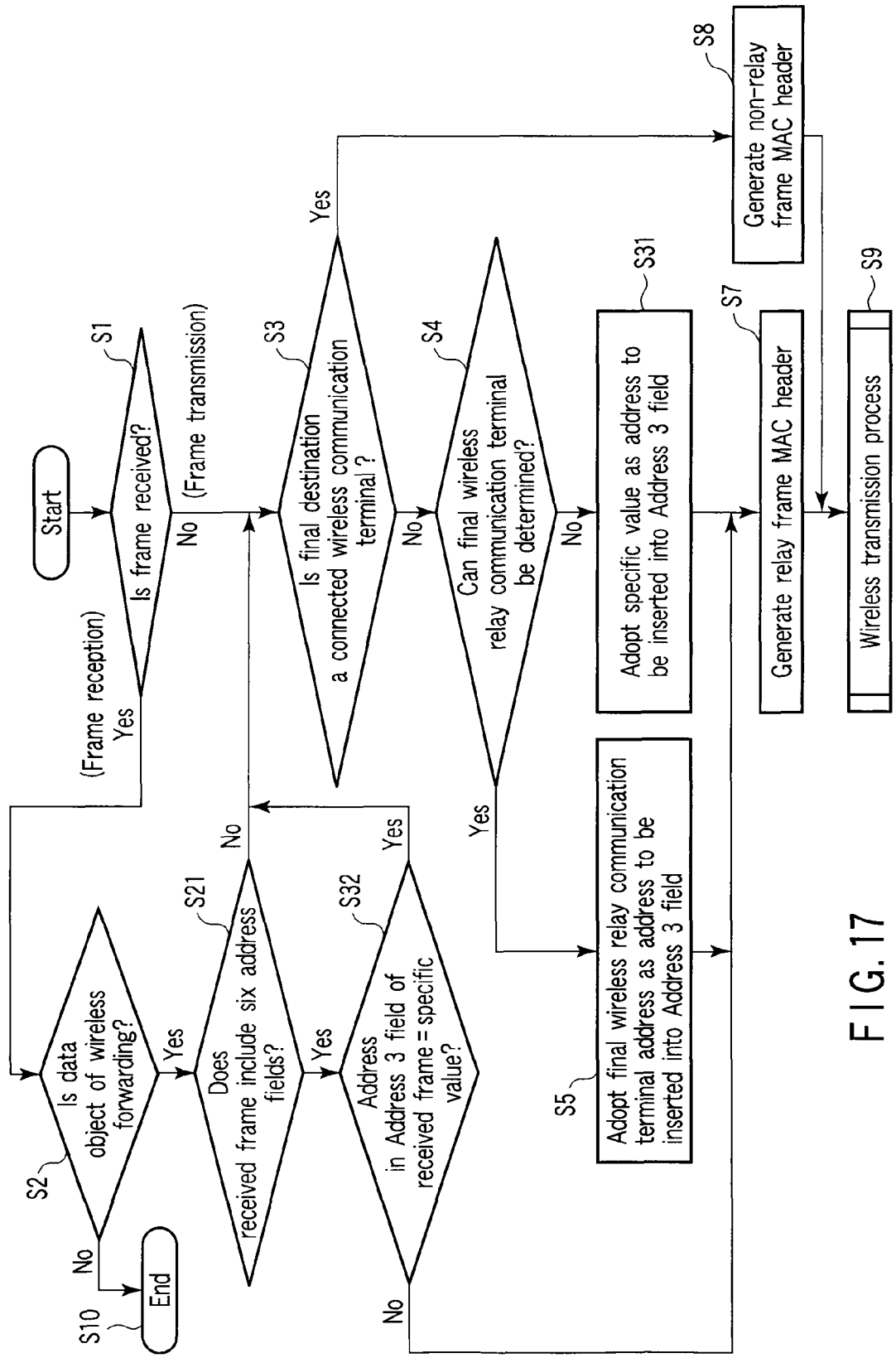
FIG. 17 is a flowchart for explaining another operation of the wireless relay communication terminal according to the fifth embodiment.
Figure 18:
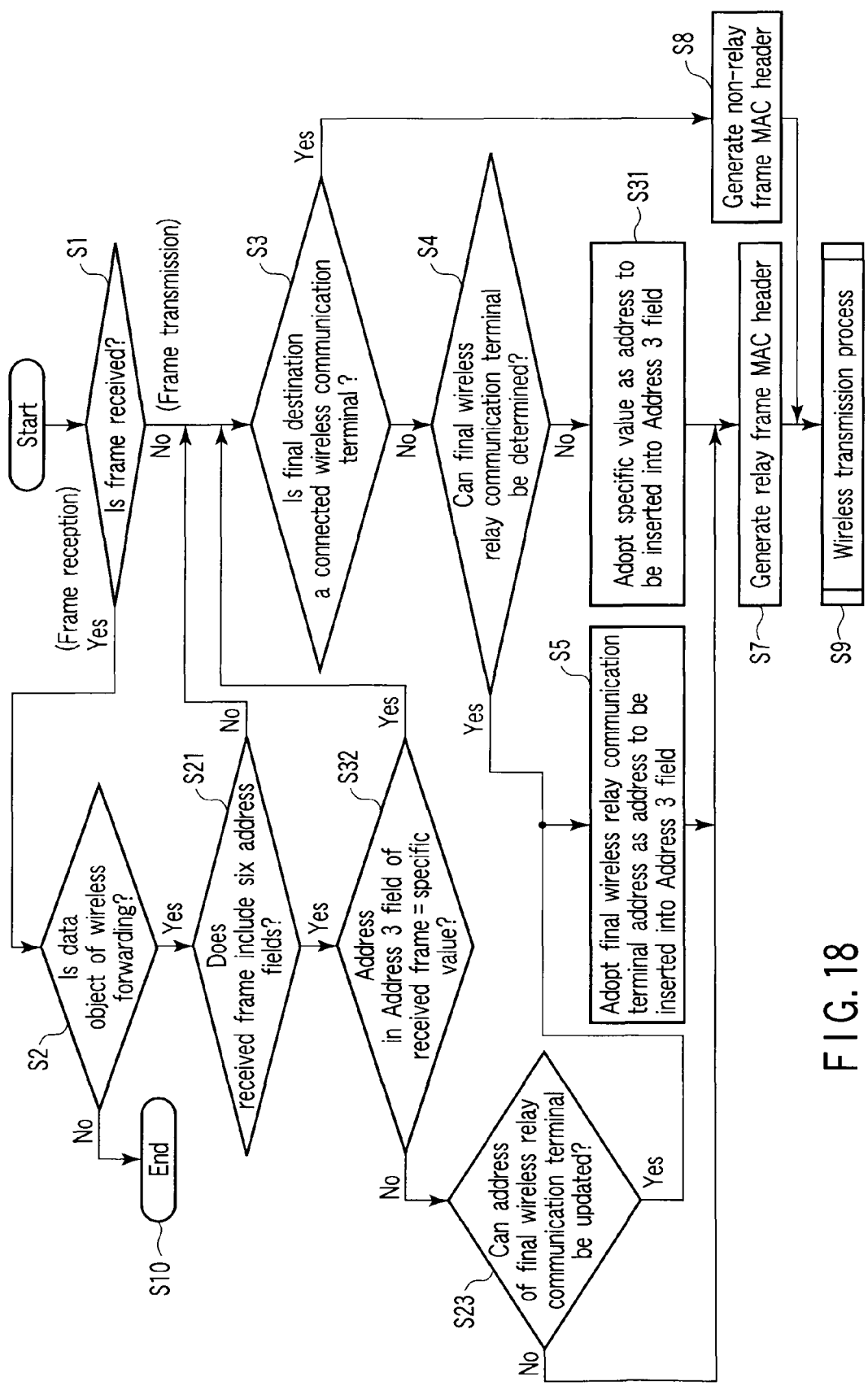
FIG. 18 is a flowchart for explaining another operation of the wireless relay communication terminal according to the fifth embodiment.

Furthermore, as shown in FIGS. 17 and 18, step S6 in FIGS. 9 and 12 may also be replaced with step S31 in FIG. 16. In this case, step S22 in FIGS. 9 and 12 are replaced with step S32 as shown in FIGS. 17 and 18. In step S32, whether the Address 3 field of a received frame contains the specific value is checked.

Referring to FIG. 16, if a communication terminal at the final destination in the received frame is not connected to the wireless relay communication terminal having received the frame (NO in step S3), the process advances to step S4. If no final wireless relay communication terminal can be determined (NO in step S4), a predetermined value (specific value) is inserted into the Address 3 field. However, the present invention is not limited to this case.

Figure 19:
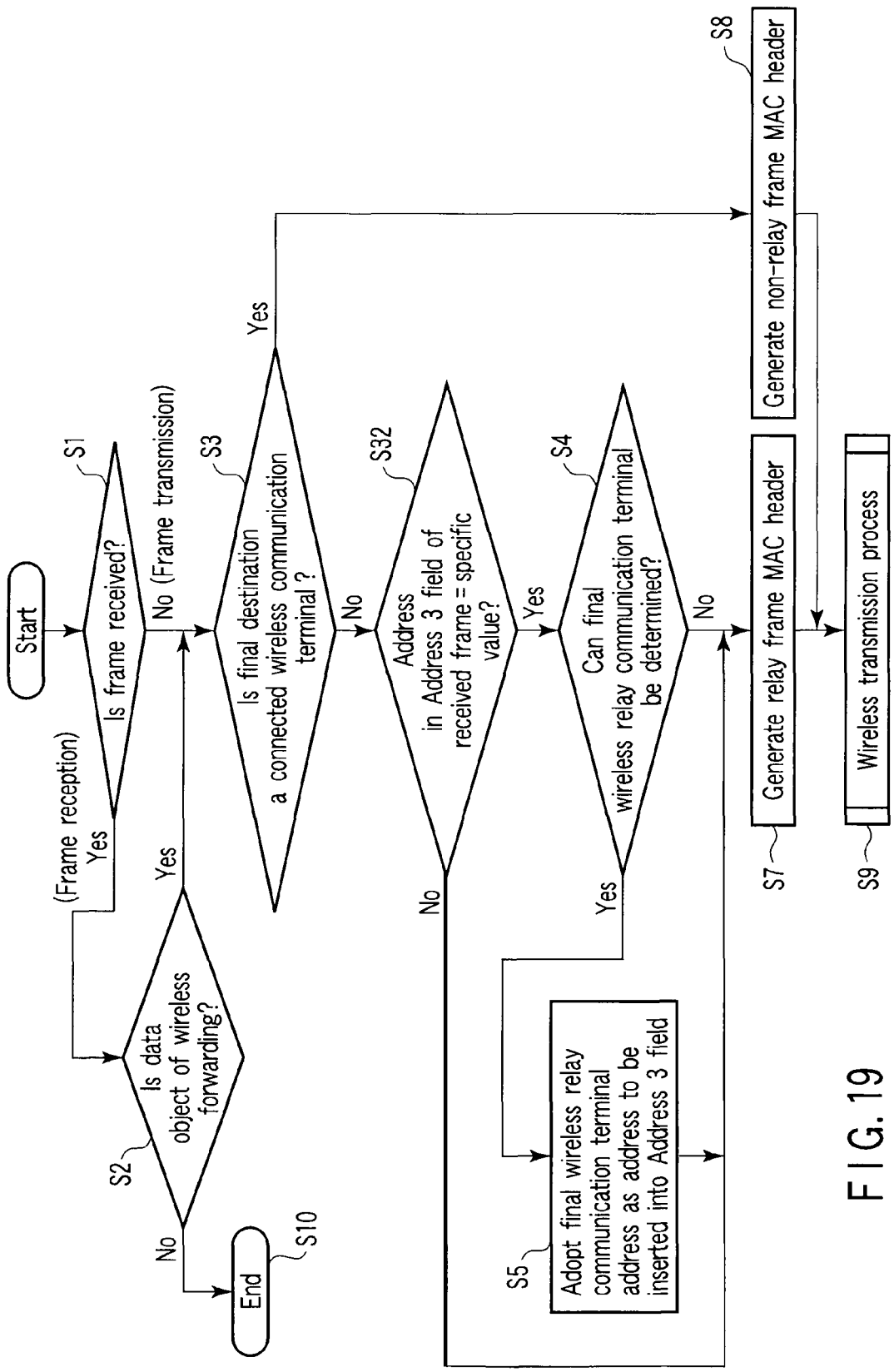
FIG. 19 is a flowchart for explaining another operation of the wireless relay communication terminal according to the fifth embodiment.

For example, as shown in FIG. 19, if the communication terminal at the final destination in the received frame is not connected to the wireless relay communication terminal having received the frame (NO in step S3), the process advances to step S32 to check whether the specific value is set in the Address 3 field of the received frame. If the specific value is set, the process advances to step S4 to check whether the final wireless relay communication terminal can be determined. If the final wireless relay communication terminal can be determined, the process advances to step S5; if not, the process advances to step S7. If it is determined in step S32 that the specific value is not set in the Address 3 field of the received frame, the process directly advances to step S7.

Figure 20:
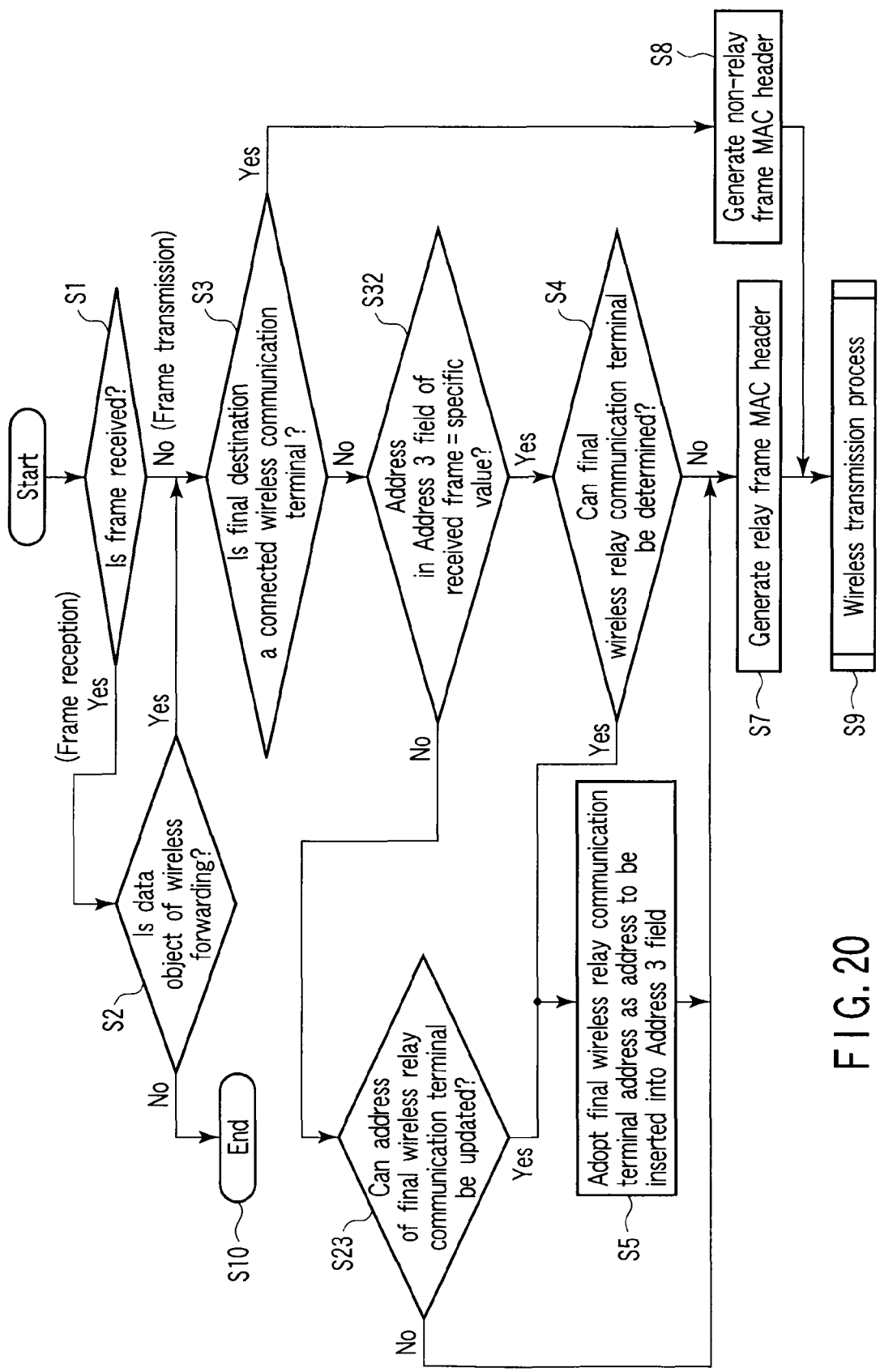
FIG. 20 is a flowchart for explaining another operation of the wireless relay communication terminal according to the fifth embodiment.

Also, as shown in FIG. 20, for example, if NO in step S3, the process advances to step S32 to check whether the specific value is set in the Address 3 field of the received frame. If the specific value is set, whether the final wireless relay communication terminal can be determined is checked in step S4. If the final wireless relay communication terminal can be determined, the process advances to step S5; if not, the process advances to step S7. If it is determined in step S32 that the specific value is not set in the Address 3 field of the received frame, the process advances to step S23 to check whether the address in the Address 3 field can be updated. If it is determined that the address can be updated, the process advances to step S5; if not, the process advances to step S7.

Figure 21:
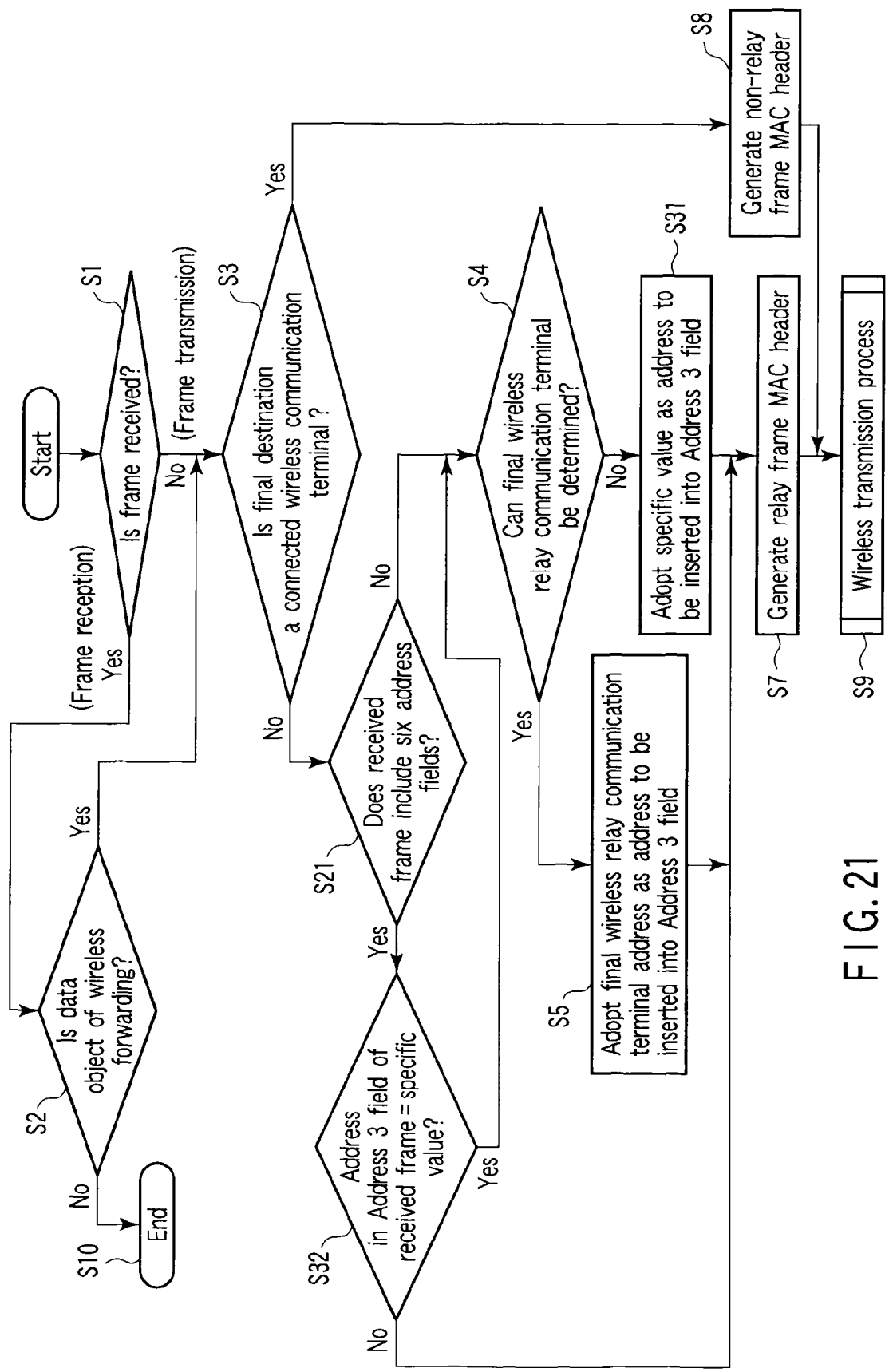
FIG. 21 is a flowchart for explaining another operation of the wireless relay communication terminal according to the fifth embodiment.

Furthermore, as shown in FIG. 21, for example, if NO in step S3, the process advances to step S21 to check whether the frame includes the six address fields (the Address 1, 2, 3, and 4 fields shown in FIG. 4 and the Address 5 and 6 fields shown in FIG. 6). If the received frame includes the six address fields, the process advances to step S32; if not, the process advances to step S4. If it is determined in step S32 that the specific value is not set in the Address 3 field of the received frame, the process advances to step S7. If it is determined in step S32 that the specific value is set in the Address 3 field of the received frame, the process advances to step S4.

The specific value is, e.g., a specific value designated by a wireless relay system. This specific value designated by a wireless relay system can be a specific value defined by a standard or a large-frame system using a certain mechanism, or a specific value unique to each wireless relay system operating on the basis of the standard or the large-frame system using the mechanism. A large-frame system using a certain mechanism is a system not based on a standard but comprising products uniquely produced in order to implement a wireless relay system.

For example, the use of a specific value designated by a certain general wireless relay system will be explained below with reference to FIG. 22. The definition of IEEE Std 802-2001 has the following limitations on address fields.

Referring to FIG. 22, each address field comprises a bit string having six octets, i.e., six bytes. Although octets from the third octet (Octet: 2) to the fifth octet (Octet: 4) are omitted from FIG. 22, each octet comprises eight bits each of which is "0" or "1".

In FIG. 22, LSB (Least Significant Bit) is the lowermost bit, MSB (Most Significant Bit) is the uppermost bit in an octet, and the first two bits, i.e., the LSB and the next bit, of the first octet are respectively called an I/G (Individual/Group) bit and a U/L (Universal/Local) bit.

The I/G bit is also represented by an I/G address bit. Including an address of the IEEE802.11 wireless LAN system, the I/G bit is set to "1" for a multicast (including broadcast) address and "0" for a unicast address for designating the address of a unique communication terminal.

The U/L bit is also represented by a U/L address bit. For an address used in the IEEE802.11 wireless LAN system, the U/L bit is set to "1" as a local address.

In the IEEE802.11 wireless LAN system, all of the bits are "1" in the broadcast address.

On the basis of the above limitations, a value in which the U/L bit is "1" and all the other bits are "0" can be used as the specific value. It is also possible to respectively set "0" and "1" as the I/G bit and the U/L bit (i.e., the first two bits are "01"), and insert a value uniquely designated by the wireless relay system into the remaining 46 bits. Alternatively, since the U/L bit need only be "1" in IEEE802.11, it is possible to set "1" as both the I/G bit and the U/L bit (i.e., the first two bits are "11"), and insert a value uniquely designated by the wireless relay system into the remaining 46 bits. In this case, as the specific value to be used, it is necessary to select at least a value that is not allocated as a specific multicast MAC address in the wireless relay system. This specific value can be inserted as a relay system ID (IDentifier) into the Address 3 field for designating the address of a final wireless relay communication terminal in the MAC header of a relay frame if the final wireless relay communication terminal cannot be determined. The specific value can also be used to identify wireless relay systems existing in the same area or in partially overlapped areas.

A wireless relay communication terminal having received the relay frame can know that the final wireless relay communication terminal could not be determined by the wireless relay communication terminal that transmitted the relay frame by detecting that the specific value is set as the final wireless relay communication terminal address of the received relay frame in, e.g., step S32 of the flowchart shown in FIG. 17. If the wireless relay communication terminal having received the relay frame can determine the address of the final wireless relay communication terminal (YES in step S4), the wireless relay communication terminal continues data relay by transmitting a frame in which the Address 3 field is rewritten, i.e., the address information in the MAC header is updated (steps S5, S7, and S9).

(Effects)

In the above fifth embodiment, if the transmission source of a relay frame cannot determine the address of a final wireless relay communication terminal, a predetermined specific value indicating this information is described in a field prepared for the address of the final wireless relay communication terminal (e.g., the Address 3 field). Accordingly, wireless relay communication terminals participating in data relay can readily detect that the field requires update, and any of these wireless relay communication terminals before the final wireless relay communication terminal inserts the address of the final wireless relay communication terminal into the field. Even when the relay frame is transmitted while the routing information of the final destination is undetermined, frame relay can be continued to the final destination via the final wireless relay communication terminal.

Sixth Embodiment

In the sixth embodiment, a method of generating a specific value unique to a wireless relay system explained in the fifth embodiment will be explained.

The fifth embodiment has explained the method that uses, as a specific value unique to a wireless relay system and used when a final wireless relay communication terminal cannot be determined, a value in which the I/G bit and the U/L bit are respectively "0" and "1" (i.e., the first two bits are "01") or both the I/G bit and the U/L bit are "1" (i.e., the first two bits are "11") in FIG. 22 and the remaining 46 bits have a value uniquely designated by the wireless relay system. In the sixth embodiment, a method of determining the 46-bit data will be explained.

This 46-bit data is generated from, e.g., a random number generated by a wireless relay communication terminal having started the wireless relay system. To execute CSMA/CA (Carrier Sense Multiple Access with Collision Avoidance) in the IEEE802.11 wireless LAN system, when it is detected that the wireless medium is idle (i.e., the medium has no transmission or is not reserved by virtual carrier sense), during the idle period, each wireless communication terminal waits for a fixed time length (Inter-Frame Space: IFS). After further waiting for the length of the number of slots designated by a randomly generated number (i.e., after performing random backoff), the wireless communication terminal transmits data. If the wireless medium becomes busy, the number of slots remaining in random backoff is held. After the wireless medium is detected to be idle again, the wireless communication terminal waits for the IFS period and resumes counting down the number of slots remaining in the random backoff procedure. When the number of slots reaches "0", the wireless communication terminal transmits data.

A random number generator for generating a random number to perform this random backoff is included in the wireless communication terminal, e.g., in the transmission/reception controller 13 shown in FIG. 2. It is possible to generate a 46-bit random number by using this random number generator, and add two bits, i.e., "0" as the I/G bit and "1" as the U/L bit to this random number, thereby obtaining a specific value unique to a wireless relay system.

A specific value unique to a wireless relay system may also be obtained by generating 46 bits by converting a code (e.g., the ASCII character code) input by a user via a user interface, and adding two bits, i.e., "0" as the I/G bit and "1" as the U/L bit to the 46 bits.

The specific value unique to the wireless relay system generated as described above is notified to another wireless relay communication terminal on the wireless relay system during the process of, e.g., constructing the wireless relay system. In this manner, this specific value can be used as a specific value to be inserted when each wireless relay communication terminal on the wireless relay system cannot determine the final wireless relay communication terminal.

The specific value can be notified to the whole wireless relay system by a method in which a wireless relay communication terminal having generated the specific value broadcast the specific value, and another wireless relay communication terminal having received the specific value further broadcast the specific value. As a method of broadcasting the specific value, for example, the specific value is inserted into a management frame whose RA is set to a broadcast address consisting of all "1"s and transmitted. The method of notifying the specific value to the whole wireless relay system may also be based on a method of relaying a data frame whose DA is the broadcast address in the conventional wireless relay system.

(Effects)

The above sixth embodiment has exemplified the method by which any of wireless relay communication terminals constructing a wireless relay system generates a specific value to be set in a field prepared in a relay frame for the address of a final wireless relay communication terminal, if the address of the final wireless relay communication terminal cannot be determined, by generating a 46-bit random number value and prefixing "10" to this random number value. The wireless relay communication terminal having generated this specific value notifies the wireless relay system of the generated specific value, thereby readily notifying all the wireless relay communication terminals in the wireless relay system of the specific value.

Seventh Embodiment

In the seventh embodiment, when transmitting a relay frame, the wireless relay communication terminal explained in any of the first to sixth embodiments described above inserts, into the relay frame, information (update information) concerning the routing information on the address table (stored in the address table storage unit 14) used when transmitting the relay frame.

This update information is inserted into, e.g., the Relay Control field before the Address 5 field in the Relay Header field shown in FIG. 6. It is also possible to add a new field after the Address 6 field shown in FIG. 6, and insert the update information into this new field.

In a wireless relay system in which wireless relay communication terminals share, periodically check, and update the routing information for delivering data to communication terminals connected to the wireless relay communication terminals and having no relay function, the update information is, e.g., the number of updated times of the routing information (address table).

To share the updated new routing information on the wireless relay system, a wireless relay communication terminal having updated the routing information broadcasts the new routing information, and another wireless relay communication terminal having received the new routing information broadcasts the new routing information, thereby the whole wireless relay system can be notified of the new routing information. To broadcast the new routing information, the new routing information is inserted into a management frame whose RA is set to a broadcast address consisting of all "1"s.

The method of notifying the whole wireless relay system of the new routing information may also be based on a method of relaying a data frame whose DA is the broadcast address in the conventional wireless relay system.

Each wireless relay communication terminal stores an address table and update information of the address table in the address table storage unit 14.

A wireless relay communication terminal having received a relay frame including the update information uses the update information in the relay frame to compare the update information of the routing information stored in the address table storage unit 14 of the wireless relay communication terminal having received the relay frame with the update information of the routing information used by a wireless relay communication terminal as the transmission source of the relay frame, thereby checking which routing information is newer.

For example, in step S23 of FIG. 12 explained in the third embodiment or in step S23 of FIG. 15 explained in the fourth embodiment, the update information in a received relay frame is used to determine whether the address of a final wireless relay communication terminal in the Address 3 field of the relay frame is newer than that of a final wireless relay communication terminal contained in routing information on the address table of a wireless relay communication terminal having received the relay frame.

If the update information of the routing information stored in the wireless relay communication terminal having received the relay frame is newer than that of the routing information used by a wireless relay communication terminal as the transmission source of the relay frame, it is determined that the routing information can be updated.

In another case, the update information may be an updated time. The updated time may be a time at which the routing information is updated or a time at which notification of the updated routing information to the wireless relay system is started. As the updated time, it is possible to use the timer value of the timer 15 (a TSF (Timing Synchronization Function) timer in IEEE802.11) formed in the transmission/reception controller 13 of a wireless relay communication terminal that starts notification of the updated new routing information. In this case, it is only necessary to be able to check whether the time information is new or old. Therefore, only a limited number of digits at the end of the TSF timer value may be used.

As a method of synchronizing the timers of wireless relay communication terminals, it is possible to use the method of synchronizing the TSF timers of wireless communication terminals in the conventional 802.11 IBSS (ad-hoc) configuration. Alternatively, a wireless relay communication terminal having started a wireless relay communication system may play the role of a wireless communication base station in the infrastructure BSS configuration, and notify the TSF timer value. In this case other wireless relay communication terminals function as wireless communication terminals connecting to the wireless communication base station and acquiring and synchronizing with the TSF timer value notified by the wireless communication base station.

In step S23 of FIG. 12 explained in the third embodiment or in step S23 of FIG. 15 explained in the fourth embodiment, if the update information of the routing information stored in a wireless relay communication terminal having received a relay frame is found to be newer than that of the routing information used by a wireless relay communication terminal as the transmission source of the relay frame, the wireless relay communication terminal having received the relay frame may notify the wireless relay communication terminal as the relay frame transmission source of the routing information stored in the address table storage unit 14 of the wireless relay communication terminal having received the relay frame.

On the other hand, in step S23 of FIG. 12 explained in the third embodiment or in step S23 of FIG. 15 explained in the fourth embodiment, if the update information of the routing information stored in a wireless relay communication terminal having received a relay frame is found to be older than that of the routing information used by a wireless relay communication terminal as the transmission source of the relay frame (if the latter is found to be newer than the former), the wireless relay communication terminal having received the relay frame may also transmit, to the wireless relay communication terminal as the transmission source of the relay frame, a request frame of requesting transmission of the routing information stored in the address table storage unit 14 of the wireless relay communication terminal as the relay frame transmission source. This request frame is transmitted as a management frame in, e.g., the IEEE802.11 wireless LAN system. A wireless relay communication terminal having received the request frame transmits, as a response frame, a management frame including the routing information held in the wireless relay communication terminal to a wireless relay communication terminal as the transmission source of the request frame.

(Effects)

In the above seventh embodiment, a wireless relay communication terminal compares the update information of the address of a final wireless relay communication terminal in a received relay frame with the update information of an address table held in the wireless relay communication terminal and containing the address of the final wireless relay communication terminal. Therefore, if, for example, the address of the final wireless relay communication terminal held in the wireless relay communication terminal having received the frame differs from that of the final wireless relay communication terminal in the received relay frame in step S23 of FIG. 12 or 15 explained in the third or fourth embodiment, it is possible to easily determine which address is newer.

If the address of the final wireless relay communication terminal held in the wireless relay communication terminal having received the frame is newer than that of the final wireless relay communication terminal in the received relay frame, the wireless relay communication terminal updates the address in a field prepared in the relay frame for the final wireless relay communication terminal with the address of the final wireless relay communication terminal held in the wireless relay communication terminal, and transmits the updated frame as a relay frame. Consequently, even when the routing information on the address table of the transmission source of a relay frame is old, a wireless relay communication terminal before the final destination can relay the frame after updating the address of a final wireless relay communication terminal in accordance with the newest routing information. Accordingly, the relay frame can be delivered to a wireless communication terminal at the final destination.

Also, when a wireless relay communication terminal having received a relay frame updates the address in a field prepared in the relay frame for the address of a final wireless relay communication terminal, the wireless relay communication terminal transmits the routing information used in the update to a wireless relay communication terminal as the direct transmission source of the received relay frame. Consequently, the wireless relay communication terminal as the direct transmission source of the relay frame can be efficiently notified of newer routing information.

Furthermore, if the address of a final wireless relay communication terminal held in a wireless relay communication terminal having received a relay frame is older than the address of a final wireless relay communication terminal in the received relay frame (although the wireless relay communication terminal having received the relay frame does not update the address in a field prepared in the relay frame to describe the address of the final wireless relay communication terminal), the wireless relay communication terminal transmits, to a wireless relay communication terminal as the direct transmission source of the relay frame, a request frame of requesting transmission of the address table (routing information) held in the wireless relay communication terminal as the direct transmission source of the relay frame. In this manner, the wireless relay communication terminal having received the relay frame can acquire newer routing information from a response frame from the wireless relay communication terminal as the direct transmission source of the relay frame.

As described above, the relay function can be readily implemented even in a situation in which a wireless relay communication terminal holding old routing information (e.g., a power saving relay terminal) exists.

Eighth Embodiment

In the eighth embodiment, when transmitting a relay frame, the wireless relay communication terminal explained in any of the first to seventh embodiments described above inserts, into this relay frame, data identification information for identifying congestion data (congestion data identification information) and information for limiting the number of times of relay (relay control information).

Congestion is a phenomenon in which identical data arrive at the same wireless communication terminal through different routes. In some cases, the same data is transmitted to the same wireless communication terminal a number of times. Data arriving at the same wireless communication terminal a number of times is called congestion data.

The congestion data identification information and the relay control information are inserted into, e.g., the Relay Control field before the Address 5 field in the Relay Header portion shown in FIG. 6. It is also possible to add a new field after the Address 6 field shown in FIG. 6, and insert the information in this new field.

The congestion data identification information is, e.g., a sequence number that is unique to the data generation source and monotonically increases. Each wireless relay communication terminal determines whether data in a received relay frame is already relayed, on the basis of the SA and the sequence number of the relay frame. If the data in the received relay frame is already relayed, the received relay frame is discarded. This makes it possible to prevent congestion data from overflowing onto the wireless relay system.

The relay control information for limiting the number of times of relay is a maximum number of times allocated for relay (a maximum number of times of multi-hop) determined by, e.g., the data generation source or the first wireless relay communication terminal (Relay SA) of the data relay. The value of the number of times of relay is reduced by one whenever a relay frame containing the data is relayed by a wireless relay communication terminal. If a wireless relay communication terminal has received a relay frame in which the value of the number of times of relay is "0", this wireless relay communication terminal does not relay the relay frame to any other wireless relay communication terminal (does not transmit the relay frame).

In this case, if a wireless relay communication terminal having received a frame containing the relay control information is connected to a wireless communication terminal at the final destination of the frame, this wireless relay communication terminal may transmit a non-relay frame to the wireless communication terminal even when the value of the number of times of relay is "0" through, e.g., steps S3 and S8 of FIG. 8. That is, the relay control information limits the number of times of transmission of a relay frame.

Contrary to the above example, it is also possible to determine a maximum number of times of relay in the wireless relay system, and use the number of actually relayed times as the relay control information. In this case, the maximum number of times of relay can be a value defined by a standard or a large-frame system using a certain mechanism, or a value unique to each wireless relay system operating on the basis of the standard or the large-frame system using the mechanism. To determine and use a maximum number of times of relay unique to each wireless relay system, for example, a wireless relay communication terminal having started the wireless relay system determines the maximum number of times of relay, and notifies another wireless relay communication terminal on the wireless relay system of the value of the maximum number of times of relay while constructing the wireless relay system. The wireless relay communication terminal having generated the value of the maximum number of times of relay broadcasts the value. Another wireless relay communication terminal having received the value further broadcasts the value, thereby the whole wireless relay system is notified of the value. For example, the value of the maximum number of times of relay is inserted into a management frame whose RA is set to a broadcast address consisting of all "1"s, and broadcasted by transmitting the frame. The value of the maximum number of times of relay may also be notified to the whole wireless relay system by using a method of relaying a data frame whose DA is the broadcast address in the conventional wireless relay system.

The relay control information may be time information for limiting the lifetime (the time of existence) of data to be relayed, instead of the number of times of relay or its maximum value as described above. In this case, relay is stopped when the lifetime has expired. For example, the time at which data is generated in the data generation source, the time at which the data is converted into a frame in the data generation source, or the time at which the frame is stored in a transmission queue for accessing a channel in the data generation source is inserted as the relay control information into the frame. As the time, it is possible to use, e.g., the timer value of the timer 15 (the TSF (Timing Synchronization Function) timer in the IEEE802.11 wireless LAN system) formed in the transmission/reception controller 13. The lifetime of data can be a value defined by a standard or a large-frame system using a certain mechanism, or a value unique to each wireless relay system operating on the basis of the standard or the large-frame system using the mechanism. The lifetime length may also be changed in accordance with the type of data.

As a method of determining and using the value of the lifetime unique to each wireless relay system, it is possible to use the same procedure as that for determining a maximum number of times of relay described above. The value of the lifetime may also be changed in accordance with the type of traffic (TID (Traffic IDentifier) in the IEEE802.11 wireless LAN system) or the type of access (AC (Access Category) in the IEEE802.11 wireless LAN system). This makes it possible to limit unnecessary relay in accordance with the characteristics of traffic. A wireless relay communication terminal refers to the time contained as the relay control information in a received relay frame, and compares the time with the timer value of the timer 15 held in the wireless relay communication terminal. If the difference between the timer value and the time of the relay control information has exceeded a predetermined lifetime length, the wireless relay communication terminal does not relay data in the relay frame (does not retransmit the data onto the wireless medium).

(Effects)

By thus describing the congestion data identification information and the relay control information in a frame, it is possible to prevent congestion data from overflowing on a wireless relay system, suppress the waste of wireless resources (e.g., the wireless medium occupation time) caused by transmission of the congestion data, and suppress the increase in power consumption of a wireless communication terminal, particularly, a wireless relay communication terminal, caused by transmission/reception of the congestion data.

As explained above, when performing multi-hop communication that forwards data to a communication terminal at the final destination via wireless relay communication terminals, each of the above embodiments makes data relay possible even if the address of a final wireless relay communication terminal connecting the communication terminal at the final destination is undetermined, or the data is forwarded via a wireless relay communication terminal holding old routing information (e.g., a power saving wireless relay communication terminal).

What is claimed is:

1. A wireless communication apparatus having a relay function, comprising:
    a memory to store an address of a first wireless communication apparatus connected to the wireless communication apparatus and having a relay function; and
    a first transmitting unit configured to transmit a first relay frame addressed to the first wireless communication apparatus, the first relay frame including
        (a) a first address field prepared for a final destination address, an address of a second communication apparatus not connected to the wireless communication apparatus being set in the first address field, and
        (b) a second address field prepared for an address of a third wireless communication apparatus connecting the second communication apparatus and having a relay function, one of an address except for the address of the third wireless communication apparatus and a specific value being set in the second address field.

2. The apparatus according to claim 1, wherein
    the memory stores addresses of a plurality of communication apparatuses including the first wireless communication apparatus, and
    the first transmitting unit transmits the first relay frame when the address of the third wireless communication apparatus is not stored in the memory.

3. The apparatus according to claim 2, further comprising a second transmitting unit configured to transmit, when the address of the third wireless communication apparatus is stored in the memory, a second relay frame including (a) the first address field in which the address of the second communication apparatus is set, and (b) the second address field in which the address of the third wireless communication apparatus is set.

4. The apparatus according to claim 1, wherein the address except for the address of the third wireless communication apparatus is the address of the first wireless communication apparatus.

5. The apparatus according to claim 1, wherein first two bits of the specific value are one of "01" and "11".

6. The apparatus according to claim 1, wherein the specific value is 48-bit data, first two bits of the specific value are one of "01" and "11", and 46 bits following the first two bits have an arbitrary value.

7. The apparatus according to claim 6, wherein the 46 bits are randomly generated.

8. The apparatus according to claim 2, further comprises a receiving unit configured to receive a frame including the first address field in which the address of the second communication apparatus is set, and
    wherein the first transmitting unit transmits, when the receiving unit receives the frame and the address of the third wireless communication apparatus connecting the second communication apparatus is not stored in the memory, the first relay frame including a frame body of the frame received by the receiving unit.

9. The apparatus according to claim 8, wherein the frame received by the receiving unit includes the second address field in which one of the address of the wireless communication apparatus and the specific value is described.

10. The apparatus according to claim 3, further comprises a receiving unit configured to receive a frame including the first address field in which the address of the second communication apparatus is set, and
    wherein the second transmitting unit transmits, when the receiving unit receives the frame and the address of the third wireless communication apparatus connecting the second communication apparatus is stored in the memory, the second relay frame including (a) the second address field in which the address of the third wireless communication apparatus stored in the memory is set, and (b) a frame body of the frame received by the receiving unit.

11. The apparatus according to claim 10, wherein the frame received by the receiving unit includes the second address field in which one of the address of the wireless communication apparatus and the specific value is described.

12. The apparatus according to claim 10, wherein
the frame received by the receiving unit includes the second address field,
the memory stores the address of the third wireless communication apparatus connecting the second communication apparatus, and
the second transmitting unit transmits, when the address of the third wireless communication apparatus stored in the memory differs from the address set in the second address field of the frame received by the receiving unit, the second relay frame including the second address field in which the address of the third wireless communication apparatus stored in the memory is set.

13. The apparatus according to claim 12, wherein the second transmitting unit transmits, when the address of the third wireless communication apparatus stored in the memory is newer than the address set in the second address field of the frame received by the receiving unit, the second relay frame including the second address field in which the address of the third wireless communication apparatus stored in the memory is set.

14. The apparatus according to claim 13, wherein
the memory further stores update information of the address stored in the memory,
the frame received by the receiving unit further includes update information of the address, and
the second transmitting unit further includes a comparison unit configured to compare the update information stored in the memory with the update information of the address in the third relay frame received by the receiving unit, to determine whether the address of the third wireless communication apparatus stored in the memory is newer than the address set in the second address field of the frame received by the receiving unit.

15. The apparatus according to claim 14, wherein the update information is one of the number of updated times and an updated time.

16. The apparatus according to claim 13, further comprising a third transmitting unit configured to transmit the information stored in the memory to a fourth wireless communication apparatus which is a transmission source of the frame received by the receiving unit, when the address of the third wireless communication apparatus stored in the memory is newer than the address set in the second address field of the frame received by the receiving unit.

17. The apparatus according to claim 8, wherein
the frame received by the receiving unit includes four address fields including the first address field, and
the first relay frame includes six address fields including the four address fields, the second address field, and a third address field prepared for relay SA that is an address of a forwarding starting point.

18. The apparatus according to claim 17, wherein
the frame received by the receiving unit includes six address fields including the first address field, the second address field, and a third address field prepared for Relay SA that is an address of a forwarding starting point of the frame, and
of the six address fields in the first relay frame, at least the address in the first address field and the address in the third address field are respectively the same as the address in the first address field and the address in the third address field of the frame received by the receiving unit.

19. A wireless communication method for a wireless communication apparatus having a relay function, including:
storing, in a memory, addresses of a plurality of communication apparatuses including a first wireless communication apparatus connected to the wireless communication apparatus and having a relay function;
transmitting, when the address of the third wireless communication apparatus is not stored in the memory, a first relay frame addressed to the first wireless communication apparatus, the first relay frame including (a) a first address field prepared for a final destination address, an address of a second communication apparatus not connected to the wireless communication apparatus being set in the first address field, and (b) a second address field prepared for an address of a third wireless communication apparatus connecting the second communication apparatus and having a relay function, one of an address except for the address of the third wireless communication apparatus and a specific value being set in the second address field; and
transmitting, when the address of the third wireless communication apparatus is stored in the memory, a second relay frame including (a) the first address field in which the address of the second communication apparatus is set, and (b) the second address field in which the address of the third wireless communication apparatus is set.

20. A wireless communication method for a wireless communication apparatus having a relay function, including:
storing, in a memory, addresses of a plurality of communication apparatuses including a first wireless communication apparatus connected to the wireless communication apparatus and having a relay function;
receiving a frame, an address of a second communication apparatus not connected to the wireless communication apparatus being set in a first address field prepared in the frame for a final destination address;
transmitting, when an address of a third wireless communication apparatus connecting the second communication apparatus and having a relay function is not stored in the memory, a first relay frame addressed to the first wireless communication apparatus, the first relay frame including
(a) a frame body of the frame received by the receiving unit,
(b) a first address field prepared for a final destination address, the address of the second communication apparatus being set in the first address field, and
(c) a second address field prepared for the address of the third wireless communication apparatus, one of an address except for the address of the third wireless communication apparatus and a specific value being set in the second address field; and
transmitting, when the address of the third wireless communication apparatus is stored in the memory, a second relay frame including (a) the frame body of the frame received by the receiving unit,
(b) the first address field in which the address of the second communication apparatus being set, and
(c) the second address field in which the address of the third wireless communication apparatus being set.

* * * * *